United States Patent [19]

Korenic

[11] Patent Number: 5,724,828

[45] Date of Patent: Mar. 10, 1998

[54] COMBINATION DIRECT AND INDIRECT CLOSED CIRCUIT EVAPORATIVE HEAT EXCHANGER WITH BLOW-THROUGH FAN

[75] Inventor: Branislav Korenic, Columbia, Md.

[73] Assignee: Baltimore Aircoil Company, Inc., Jessup, Md.

[21] Appl. No.: 426,029

[22] Filed: Apr. 21, 1995

[51] Int. Cl.$^6$ ...................................................... B01F 3/04

[52] U.S. Cl. ............................... 62/305; 62/309; 62/310; 165/900; 261/151; 261/158; 261/160; 261/138; 261/DIG. 77

[58] Field of Search ............................ 62/305, 309, 310; 165/900; 261/DIG. 77, 151, 158, 160, 138

[56] References Cited

U.S. PATENT DOCUMENTS

| | | | |
|---|---|---|---|
| 2,247,514 | 7/1941 | Mart | 261/11 |
| 2,507,604 | 5/1950 | Larson | 62/305 |
| 2,661,933 | 12/1953 | Deverall | 261/151 |
| 2,852,090 | 9/1958 | Kelley | 261/151 |
| 2,890,864 | 6/1959 | Stutz | 62/310 |
| 3,012,416 | 12/1961 | Dart | 62/305 |
| 3,141,308 | 7/1964 | Dart | 62/305 |
| 3,148,516 | 9/1964 | Kals | 62/305 |
| 3,365,909 | 1/1968 | Brainard | 62/305 |
| 3,747,362 | 7/1973 | Mercer | 67/171 |
| 3,820,353 | 6/1974 | Shiraishi et al. | 62/305 |

(List continued on next page.)

FOREIGN PATENT DOCUMENTS

| | | | |
|---|---|---|---|
| 712874 | 7/1965 | Canada | 162/310 |
| 1038636 | 9/1978 | Canada | 62/310 |
| 1149729 | 7/1983 | Canada . | |
| 0057801 | 8/1982 | European Pat. Off. . | |
| 5223749 | of 1977 | Japan . | |
| 5340769 | of 1978 | Japan . | |
| 0254985 | 6/1990 | Japan . | |
| 5-25161 | of 1993 | Japan . | |

OTHER PUBLICATIONS

Niagra Blower Company, Sales Brochure Entitled "Wet–Surface Air Coolers" p. 41, ASHRAE Journal, Aug. 1979.
IMECO Incorporated Sales, Brochure Entitled "PF Evaporative Condensors"; no other information known. (No date).
Rescorcon Incorporated, Sales Brochure Entitled "Wet Surface Air Coolers"; no other information known. (No date).
Baltimore Aircoil Company, Sales Brochure Bulletin No. S384/1–ODA, Entitled "Low Profile Series VL". (No date).
Baltimore Aircoil Company, Sales Brochure Bulletin No. S408/1–FA, Entitled "Series V Industrial Fluid Coolers". (No date).

Primary Examiner—John K. Ford
Attorney, Agent, or Firm—Edward J. Brosius; F. S. Gregorczyk; Stephen J. Manich

[57] ABSTRACT

A heat exchange apparatus which can be used as an evaporative condenser, fluid cooler or wet-air cooler, is provided with a direct evaporative heat exchange section overlying an indirect evaporative heat exchange section. An air entry zone common to both heat exchange sections receives an air stream blown into this zone by at least one fan, thereby pressurizing the plenum such that the air stream is forced to split and enter each section while inside the apparatus. This eliminates the need for separate air entries, thus condensing the size and cost of the apparatus, while increasing heat exchange capacity. A countercurrent air flow pattern through the direct section provides a uniformly cooled evaporative liquid for use in the indirect section. The evaporative liquid flow is parallel to the air stream provided in the indirect section. A process fluid inside the circuits of the indirect section can accept or reject heat from the evaporative liquid received from the direct section, with a part of the heat being is transferred into the indirect section air stream in sensible and latent form, thus increasing or decreasing the enthalpy of the air stream. The remaining heat can be either stored or released from the evaporative liquid to increase or decrease its temperature. The evaporative liquid is collected in a sump and then pumped upwardly for re-distribution across the direct evaporative heat exchange section.

49 Claims, 9 Drawing Sheets

U.S. PATENT DOCUMENTS

| | | | |
|---|---|---|---|
| 3,865,911 | 2/1975 | Lefevre | 261/140 |
| 3,923,935 | 12/1975 | Cates | 261/259 |
| 3,925,523 | 12/1975 | Cates | 261/DIG. 77 |
| 4,112,027 | 9/1978 | Cates | 261/111 |
| 4,119,140 | 10/1978 | Cates | 165/900 |
| 4,252,752 | 2/1981 | Flandroy | 261/153 |
| 4,315,873 | 2/1982 | Smith | 261/158 |
| 4,476,065 | 10/1984 | McKey | 62/305 |
| 4,683,101 | 7/1987 | Cates | 261/146 |
| 4,893,669 | 1/1990 | Kashiwada et al. | 165/900 |
| 4,974,422 | 12/1990 | Kocher | 62/305 |
| 5,435,382 | 7/1995 | Carter | 165/900 |

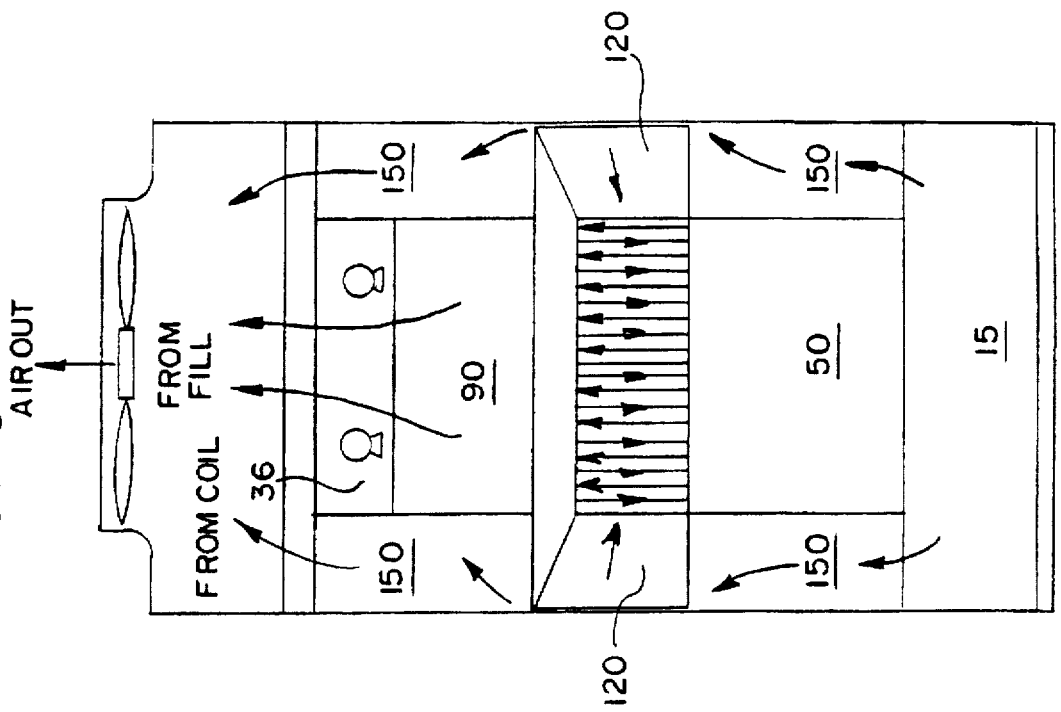
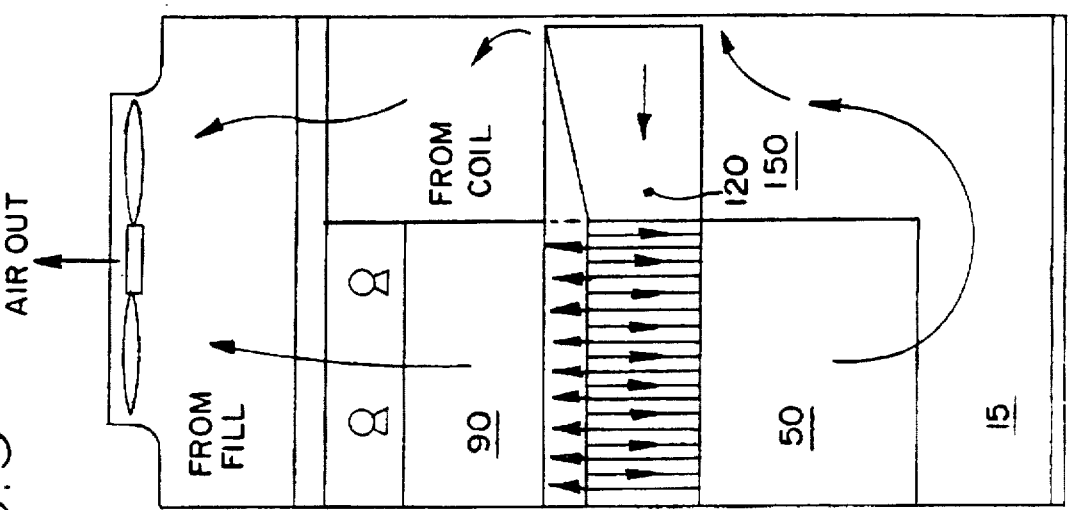

COMBINATION DIRECT AND INDIRECT CLOSED CIRCUIT EVAPORATIVE HEAT EXCHANGER WITH BLOW-THROUGH FAN

FIELD OF THE INVENTION

The present invention generally relates to a heat exchange apparatus such as a closed-loop cooling tower, an evaporative condenser, or a wet-air cooler. More specifically, the present invention relates to a very compact, stacked combination of separate direct and indirect evaporative liquid heat exchange sections wherein a performance-enhancing, initially uniform temperature evaporative liquid exiting the direct section is distributed across the indirect section. When compared to other similarly sized and currently commercially viable indirect evaporative heat exchange products, the present invention is capable of achieving far greater heat transfer capability per unit size and cost because of its uniquely pressurized air entry zone, which is common to both heat exchange sections. This zone internally dissects a single, entering stream of air between each of the heat exchange sections, thereby providing dual, yet separate air flow paths to each section in a way which ensures that the performance-enhancing uniform temperature liquid will be distributed across the indirect heat exchange section.

In accordance with the present invention, relatively dry, ambient air is blown by a fan into a specially designed space, or entry zone which exists between the top of the indirect section and the bottom of the direct section. Since the air in this zone is pressurized by the fan (forced draft system), it will seek its own distribution through the passages inside the apparatus; upward into the direct section and downward into the indirect section. At the same time, an evaporative fluid (commonly water) is distributed across the top of the direct section at uniform temperature, where it is in direct contact with the counterflowing air stream, wherein the two mediums undergo heat and mass transfer. As the evaporative fluid in the direct section descends, it leaves this section at a lower and uniform temperature. After a short free fall through the air entry zone, it distributes itself across the top of the indirect section and downwardly travels through the series of tubing circuits comprising the indirect section in a parallel fashion with the corresponding air stream. The conduits of the indirect section conduct an internal fluid stream that is to be preferably cooled, although this fluid could be heated, as will become clearer shortly.

When the present invention is used as a closed loop cooling tower, or evaporative condenser, heat is indirectly transferred from the internal fluid stream to the film of evaporative liquid wetting and surrounding the outer surface of the circuits. Part of the heat removed from the fluid stream in the circuits is transferred to the air stream as sensible and latent heat causing an increase of the enthalpy of this air to occur, while the remaining portion of the heat is stored as sensible energy, resulting in a temperature increase of the evaporative liquid. This warm evaporative liquid drains from the indirect section into the collecting sump and is pumped upwardly for redistribution across the direct evaporative heat exchange section. The sensible energy stored in the evaporative liquid is then transferred in the direct evaporative heat exchange section to a second and separate air stream passing there through. This transfer of heat results from a latent and sensible heat transfer from the falling evaporative liquid into the upcoming air stream through the same section of the apparatus.

When the present invention is used as a wet-air cooler, the direct and indirect evaporative heat exchange sections perform exactly as described above, except that now the heat transfer is performed in the opposite direction. Instead of releasing heat as previously described, the fluid stream inside the circuits of the indirect heat exchange section, receives heat from the air stream, thus cooling the air stream. The process is in reverse from that described in detail before for the evaporative fluid coolers and condensers.

BACKGROUND OF THE INVENTION

Closed loop evaporative heat exchangers can be broadly grouped into three general categories: (1) Sensible heat exchanger—direct evaporative heat exchanger systems, where one of the fluid streams from the sensible heat exchanger is piped to a direct evaporative heat exchanger; (2) Stand-alone indirect evaporative heat exchangers; and (3) Combination direct and indirect heat exchangers.

Shell-and-tube refrigerant condensers or sensible heat exchangers, which are connected to separate cooling towers, are examples of the first group, and they represent the predominantly used type of heat exchange method in which evaporative cooling is normally utilized. Products referred to as "coil sheds" are also part of this first group, and coil sheds consist of a cooling tower (direct evaporative heat exchanger) located directly above a non-ventilated coil section (sensible heat exchanger).

Stand-alone indirect evaporative heat exchangers represent the second group and these devices are typically not as much used as those of the first group. The majority of evaporative condensers and evaporative fluid coolers are of this type. Products with the air and evaporative liquid streams in counterflow, crossflow, or parallel flow are commercially available, but the counterflow design predominates.

The third group involves the products which combine both indirect and direct evaporative heat exchange sections. This group is used the least. The present invention is a subsection of this group and it represents a blow-through or forced draft design where fans are mounted at the inlet to the unit in the dry-air stream. The previous art in this group typically refers to an induced draft fan mounted on the discharge side of the product, where the air is induced into each of the heat exchange sections, thereby exposing the fan to a high discharge of humid air which often carries water droplets and mist. This is considered as a disadvantage over the forced draft design where the fan is placed at the inlet, being exposed to a dry air stream.

Furthermore, it should be clear that the blow-through or forced draft design operates at a positive pressure, whereas an induced draft design operates at a negative pressure. Operating under positive pressure rather than a negative pressure offers advantages readily identifiable by those in the art. Therefore, the present invention fills an existing gap in blow-through type designs by targeting the third group, and it further offers retrofitting capabilities to cooling towers using centrifugal fans.

More particularly stated, the present invention is concerned with a particular combination of direct and indirect evaporative heat exchange devices within a single apparatus which utilize a blow-through, forced draft fan assembly which is mounted such that the inlet air is free of excessive moisture, water droplets and mist, and which operates under positive pressure relative to the referenced surrounding ambient pressure. Furthermore, a unique solution has been provided for the air entry into the space between two sections of the apparatus. Finally, this design of the apparatus offers a method of achieving maximum heat exchange efficiency of both the indirect and direct evaporative cooling sections and, therefore, offers a better and more cost-effective solution to the heat transfer apparatus which are currently in existence with the fans at the air intake.

In a direct evaporative heat exchanger, an ambient air stream and an evaporative liquid stream are intimately involved with each other, whereby the two streams evaporatively exchange heat and mass when they come into a direct contact with each other. The evaporative liquid is typically water. In an indirect evaporative heat exchanger, three fluid streams are involved; an air stream (a part of the main inlet air supply), an evaporative liquid stream, and a fluid stream enclosed within heat exchanger circuits or tubings. The enclosed fluid stream first exchanges sensible heat with a thin film of evaporative liquid flowing over the outside surface of the circuits. Since the evaporative liquid does not directly contact the fluid stream in the tubes, the heat exchange method is considered "indirect". The evaporative liquid and the air stream undergo heat and mass transfer when they directly contact each other, and the evaporative liquid either liberates or absorbs energy from the fluid stream. For example, if the evaporative liquid absorbed heat from the fluid stream within the tubes, it would transfer a part of this heat to the air stream in the form of a sensible and latent heat (an increase of enthalpy of the air stream), and would store the remainder of the heat within its own mass, thus raising its temperature. The difference in evaporative liquid temperature between the inlet and the outlet is known as a "spray water temperature range". The greater this range, the greater the amount of heat exchange capacity.

When the present invention is used as an evaporative condenser, the heat exchange processes within each heat exchange section are the same as explained for the closed circuit fluid cooling apparatus, except that a hot refrigerant condenses at an isothermal condition when cooled. The flow of the fluid within the circuits, now a refrigerant gas, is typically reversed from that in the case of sensible cooling of liquids in the circuits, in order to facilitate drainage of the condensate within the circuits.

When applied as a wet-air cooler, which uses an initially cold single phase fluid or evaporating refrigerant inside the circuits, the heat exchange processes are the same as explained earlier for the fluid cooling or condensing applications, except that the flow of heat is reversed; heat from the air stream is released to the internal fluid. The usefulness of this mode of application results in the production of a cold, saturated air stream leaving the apparatus. The cold air stream can be used for numerous cooling applications.

Prior art emphasizes the importance of providing evaporative fluid with uniform temperature to the top of the indirect section for maximum heat exchange efficiency since the water, and its heat temperature range, greatly controls the heat exchange capacity of the apparatus. In this regard, the indirect-over-direct arrangement has been reported as a preferred choice, and the following discussion of the prior art is provided to differentiate the present invention from the reported prior art.

Prior art combinations of direct and indirect evaporative heat exchange sections (U.S. Pat. Nos. 4,112,027; 4,683,101; and 3,141,308) describe use of a crossflow direct evaporative section above the indirect section. However, use of the crossflow direct evaporative section above the indirect section unfavorably results in a temperature gradient being formed in the cooling water as it descends through the direct evaporative section. That water temperature gradient causes non-uniform heat exchange within the direct section as a result of the crossflow air moving horizontally inward and becoming saturated with the heat absorbed from the descending water. This means that the inner-most portions of the direct heat exchange section are effectively trying to exchange heat with an already heated air stream, thereby creating uneven heat exchange with the descending evaporative liquid, which leaves the evaporative liquid along the longitudinal bottom row of the direct section with a non-uniform temperature. As discovered by U.S. Pat. No. 4,683,101, this gradient in the exiting water temperature can be in the order of 6°–10° F. across the direct heat exchange section. More importantly, when the direct section is positioned directly above the indirect section, the non-uniform temperature water with gravity drain downward and fall directly onto the series of underlying circuits which comprise the indirect section. In effect, the water temperature gradient has been preserved and then passed into the indirect section, a non-uniform exchange of heat to occur from circuit to circuit within the indirect section. Those in the art know that the non-uniform heat transfer caused by the gradient is a source of overall thermal inefficiency to the tower. The same non-uniform heat transfer conditions represent additional operating inefficiencies during an evaporative condensing application since liquid condensate will back up within the unevenly loaded circuits, namely in the circuits experiencing the coldest available air stream. Therefore, condensate in the circuits will limit the surface area available for condensing. The disclosure of U.S. Pat. No. 4,683,101 tried to address this problem by physically changing the orientation of the indirect heat exchange circuits, as well as the internal fluid flow direction within the circuits, so that the hottest fluid to be cooled within the circuits was in thermal exchange with the hottest temperature of cooling water within the gradient. However, that arrangement failed to address the formation of the water temperature gradient problem itself, therefore, the effects the gradient had upon heat exchange efficiency within the indirect heat exchange section were neglected.

In the closed circuit fluid cooling tower of pending application, Ser. No. 08/078,629, also owned by the Assignee of the present invention, it was discovered that distributing an initially uniform temperature evaporating liquid over the indirect evaporative heat exchange section had a substantial effect upon the uniformity of heat exchange within that section. That invention realized that since the evaporative liquid performed the majority of the heat exchange function within the indirect section, the water temperature gradient had to be removed in order to maximize heat exchange capacity. Further heat exchange efficiency increases were realized when the air and evaporating liquid media were made to flow in the same direction to each other, while counterflow to the fluid stream.

However, one disadvantage to the arrangements presented in that application, was the use of axial or propeller fans in the discharged, wet air stream, which influences the height and size of the tower. With propeller fan arrangements, the tower height has a natural tendency to create a structure location problem, as well as a cost problem. Furthermore, those designs had to be field erected from large sections which could not be easily transported by conventional means such as over-the-road trucks.

On its face, it would appear that the only fundamental difference between the present invention and the heat exchange devices of the aforementioned application, would be that the current disclosure represents a forced draft design, while the previous application represents an induced draft design. Operationally, however, the direct evaporative section is a trapezoidal counterflow evaporative liquid-air flow concept, while the previous application concentrates on the crossflow direct evaporative section design. Finally, the present design places the direct section over the indirect section with specially designed air entry space between these two sections, which very much departs from the concept(s) disclosed in the previous application.

The present invention overcomes the above disadvantages direct-over-indirect design since it provides a uniform temperature of evaporative liquid for use in the indirect section of the apparatus as will be described in the upcoming sections.

SUMMARY OF THE INVENTION

It is an object of the present invention to provide a positive pressure heat exchange apparatus of a compact design which can operationally incorporate the benefits of sensible and evaporative heat exchange phenomena from an indirect and direct heat exchange section. It is another object of the present invention to provide a heat exchange apparatus which incorporates a common and pressurized air plenum between direct and indirect heat exchange sections in order to minimize necessary space requirements between the two sections. It is still another object of the present invention to provide a heat exchange apparatus which uses a forced draft fan, free from the effects of excessive humidity and water droplets, to promote maximization of uniform air distribution in order to provide respective uniform temperature gradients in the water and air paths at any vertical point within the apparatus.

BRIEF DESCRIPTION OF THE DRAWINGS

In the drawings:

FIG. 9 is a cross sectional view of the present invention taken at the air entry, incorporating an induced-draft propeller fan, heat exchange sections stacked along a side wall of the structure, a single vertical discharge plenum and an air inlet having a wedge-shaped addition.

FIG. 10 is a cross sectional view of the present invention taken at the air entry, incorporating an induced-draft propeller fan, heat exchange sections centered within the structure, dual, vertical discharge plenums, and an inlet having dual wedge-shaped additions;

DESCRIPTION OF THE PREFERRED EMBODIMENT

Figure 1:
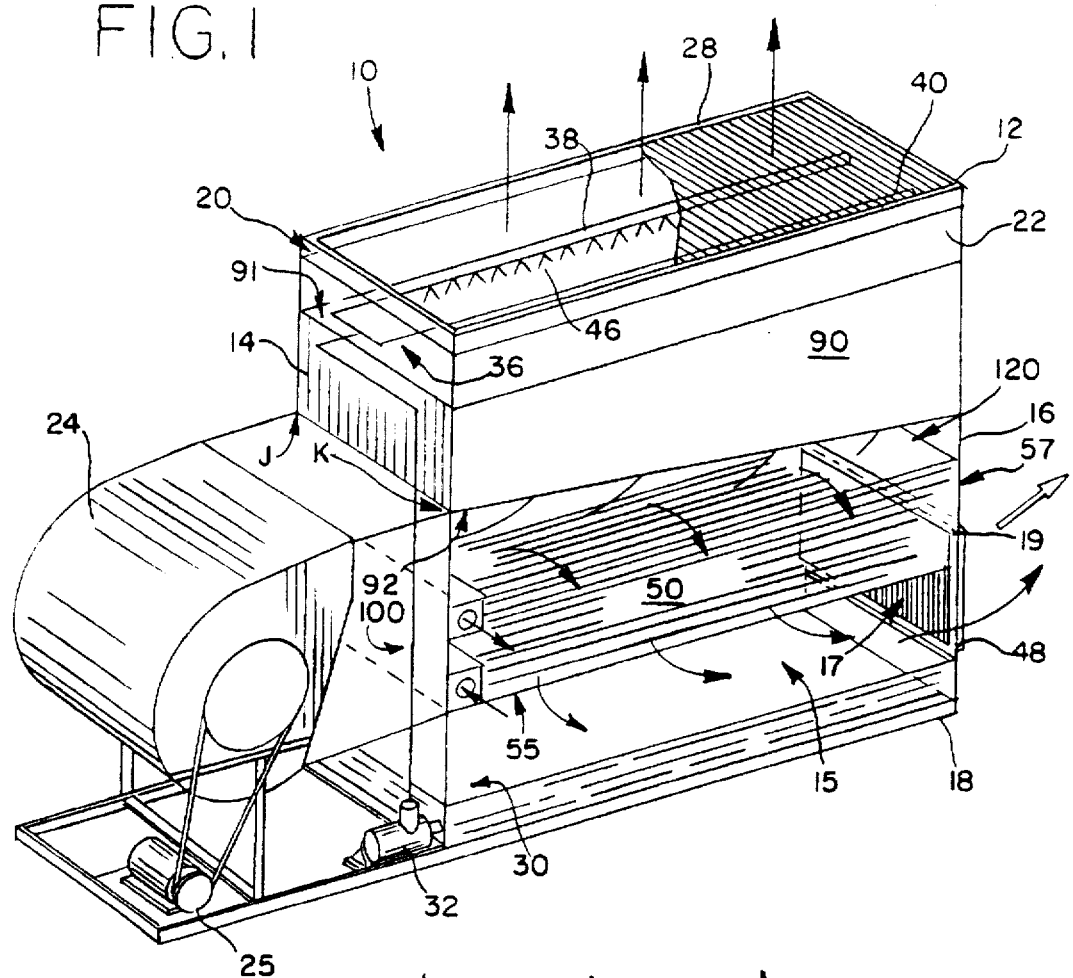
FIG. 1 is a perspective view of the present invention using an end mounted blow-through centrifugal fan in conjunction with physically short indirect and direct evaporative sections requiring relatively low air volumes)

Referring now to FIG. 1 of the drawings, the heat exchange apparatus 10 in accordance with the invention is shown and is well known in the art as a closed-circuit cooling tower. Generally, apparatus 10 includes an enclosure structure which contains a multi-circuit indirect evaporative fluid cooling section 50, a direct evaporative heat exchange section 90, a lowermost evaporative liquid collection sump 30, and an uppermost distribution means 36 spraying an evaporative liquid downwardly through apparatus 10. A fan means 24 moves a single stream of air into the tower's only air inlet 100, and then into entry zone 120 within apparatus 10, where it is split into two individual air streams. The first air stream upwardly enters the direct heat exchange section 90, and the second air stream downwardly enters the heat indirect exchange section 50. Fan 24 is a forced draft centrifugal fan, requiring fan motor 25 to power it, and as the figure illustrates fan 24 and motor 25 are both externally mounted from enclosure 10. External mounting means that a wet condition motor casing is not required, and that the entire fan assembly is not operationally exposed to a moist air stream which might contain water droplets.

As mentioned earlier, apparatus 10 has many applications in the heat exchange field and each application will use the same above-mentioned elements, although the operation of those elements might vary slightly from one type of application to the other. For example, apparatus 10 may be used to cool a single phase, sensible fluid such as water, which is flowing within an externally-supplied closed circuit system, or it may be used to desuperheat and condense a multi-phase, sensible and latent fluid such as a refrigerant gas, also supplied from an external closed-circuit system. Finally, apparatus 10 may also include duty as a wet air cooler, where the air discharged into passageway 15 is piped offsite to be used as a fresh, cooled air supply for an operation such as mining.

As will become evident, the physical tower structure containing the above-mentioned components can be arranged in a number of different ways so that apparatus 10 is not strictly limited to the arrangement of FIG. 1, although it should be noted that any disclosed embodiment will operably perform in substantially the same way, with only the final heat exchange capacities varying, as will be better understood from the more detailed description of each embodiment.

In accordance with one embodiment of the present invention illustrated in FIG. 1, the enclosure structure comprising apparatus 10 is shown with a generally rectangular shape which includes a generally open upper roof 12, a base 18, a front wall 16, a rear wall 14, a first side wall 20 and a second side wall 22. The side walls 20,22 and rear wall 14 are substantially solid panel members made from materials such as sheet metal, fiberglass, plastic, or the like, and these walls have corrosion resistant properties, as does front wall 16 and roof surface 12. The front wall 16 is generally solid at the top, approximate to the direct heat exchange section 90, and has an opening 17 at the bottom. Opening 17 has a vertical extent which is defined by base 18 and edge 19 of wall 16, and is covered by drift eliminator 48. Opening 17 is also in communication with passageway 15, which is the open area directly underneath indirect section 50, bounded by the perimeter of sump 30.

The indirect evaporative heat exchange section 50 also has a generally rectangular shape and is comprised of a plurality of individual circuits or coils that define an inboard side 51, an outboard side 57, a top side 53 and a bottom side 55. The indirect section 50 is mounted in vertical alignment below direct section 90 with air entry zone 120 interposed therebetween. Indirect section 50 is also vertically displaced above base 18 so that bottom side 55 is substantially coextensive with edge 19, and top side 53 is coextensive with the air inlet bottom side 101, as best seen from viewing FIG. 2.

The plurality of coil comprising this section receive a hot fluid to be cooled from an offsite process, and it is cooled by a combination of indirect sensible heat exchange and direct evaporative heat exchange. An evaporative liquid, which is usually cooling water, is sprayed downwardly by distribution means 36 into the direct section 90 and is cooled by direct evaporative heat exchange, before gravity feeding into the indirect sensible heat exchange section 50. Distribution means 36 is comprised of the piping and spray header system above the direct section and will be described in greater detail later. As mentioned, a single stream of ambient air enters apparatus 10 through air inlet 100 and is blown into the air entry zone 120 wherein zone 120 is pressurized such that the pressurization causes the simple stream to split into two air streams; the first air stream flows upwardly to evaporatively cool the descending water in the direct section, and the second air stream flows downwardly through the indirect section to evaporatively cool the evaporative liquid which has exchanged heat with the fluid flowing within the circuits comprising the indirect heat exchange section. The air stream dedicated to the indirect section will always enter top side 53 of the indirect section 50 and flow parallel to the direction of the cooling water. Once the air and water cooling mediums reach bottom side 55, they separate, with the now-warmed air stream being pulled into passageway 15 for discharge out of tower front wall opening 17, which as mentioned is typically covered by drift eliminators 48. The heated cooling water gravitationally descends into collection sump 30 before being recirculated to the direct section 90.

The air stream exiting the indirect section 50 and apparatus 10 is not restricted to exiting only through front wall 16. It is possible to discharge this air out with similar openings (not shown) in one or both sidewalls 20,22, or to direct the air flow internally upwards along one or both of the sidewalls, as shown in the alternative embodiments of FIGS. 4 and 5, which will be described in detail later. As will become clearer later, a vertical discharge path is the preferred method when using a larger capacity unit since they have higher operating velocities and air volumes.

Figure 2:
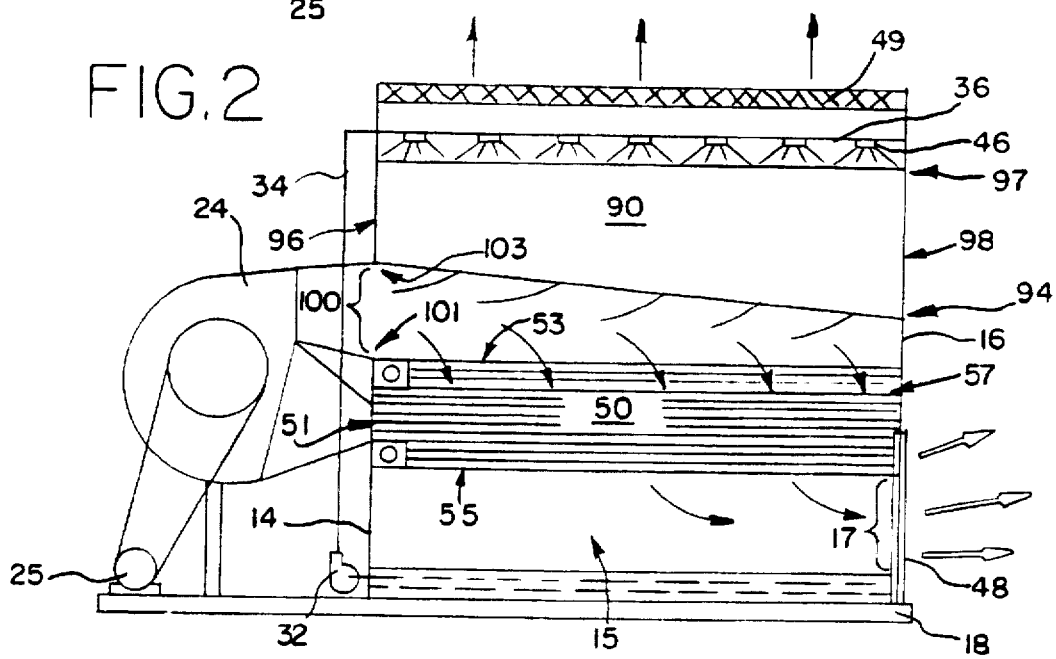
FIG. 2 is a side view of the preferred embodiment shown in FIG. 1.
Figure 3:
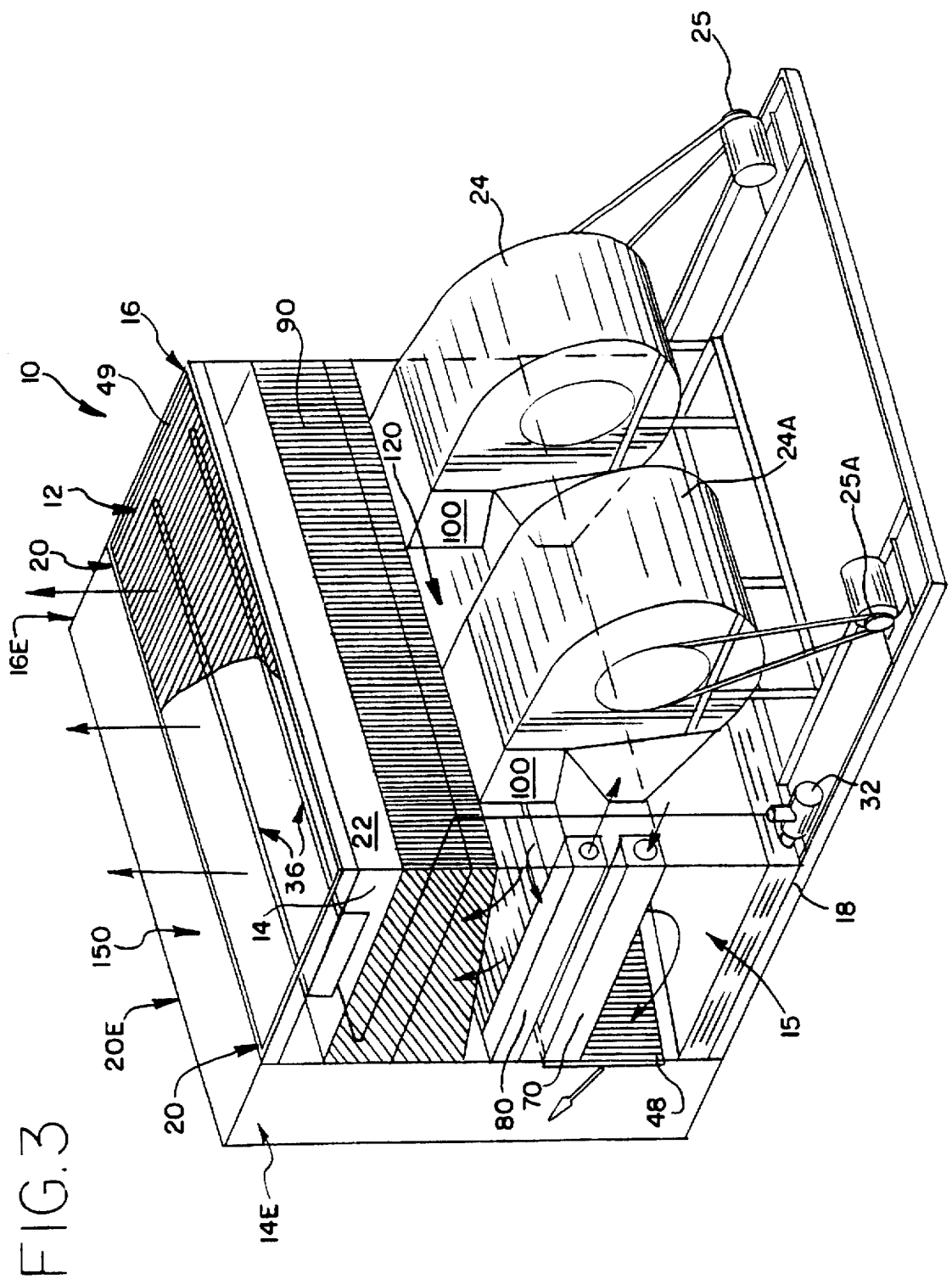
FIG. 3 shows another embodiment of the present invention where a pair of blow-through centrifugal fans are arranged side-by-side and positioned in a tower side to accommodate higher air volume capacities than the above embodiment.
Figure 8:
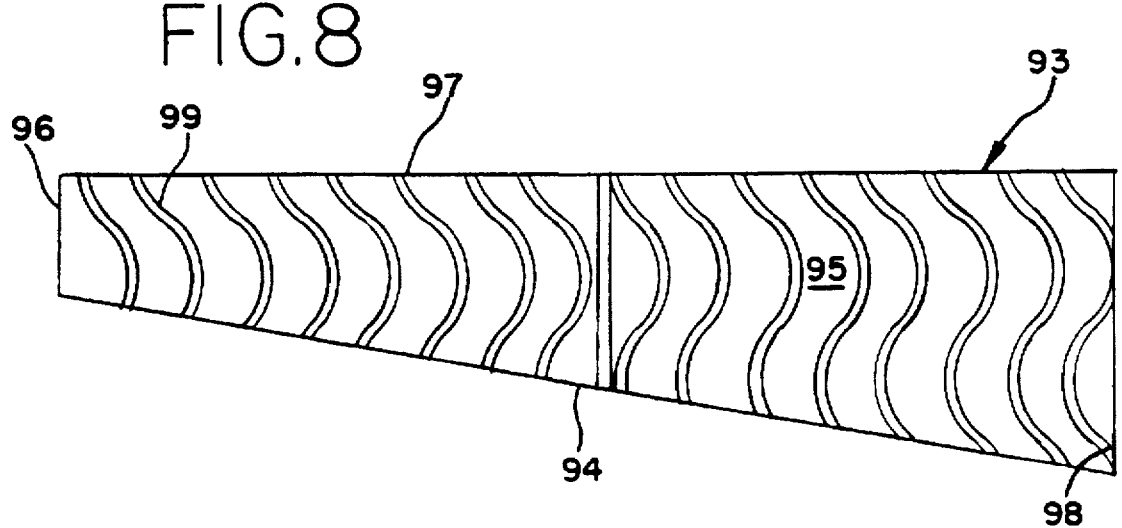
FIG. 8 is a side view of an individual fill sheet which comprises the direct heat exchange section fill bundle.

The direct evaporative heat exchange section 90 functions to cool the heated water that has indirectly exchanged heat with the fluid stream flowing within the circuits of the indirect section. As FIGS. 1 and 2 show, a pump 32 vertically lifts the water from sump 30 through piping 34, into spray means 36 at the top of direct heat exchange section 90, where it is distributed over the tightly-spaced fill sheets 93 comprising the section. FIG. 8 shows that each individual sheet 93 has a face 95 defined by a horizontal upper edge 97, and a sloped, non-parallel lower edge 94, extending between a short side edge 96, and an opposite longer side edge 98. The plurality of such fill sheets is generally referred to as a fill bundle and in this embodiment the bundle is suspended within the cooling tower with each short side edge 96 disposed along rear wall 14 so that the diverging lower edges 94 decline away from the top edge 103 of air inlet 100, towards the base 18, thereby forming a sloped boundary and interface with the air entry zone 120. It is to be noted that the fill sheets 93 are oriented to position the faces 95 parallel with the air stream entering air inlet 100 and that in some applications, the lower edges 94 can be made parallel to upper edge 97. In the illustrated embodiment, the plurality of parallel fill sheets 93 (only one such sheet being visible from the side) have a generally trapezoidal shape with each sheet being substantially identical to the other. As seen, all sheets extend the entire longitudinal length of the structure, which is defined as the distance between walls 14 and 16. FIG. 3 shows another embodiment where the fill sheets extend in the same parallel fashion between sidewall 20 and 22. In either case, the parallel arrangement results in a uniform media density. Hot water from sump 30 is pumped upwardly through spray means 36 and is distributed uniformly across each fill sheet 93. The first stream of air is directed into the bottom of the direct section in order to evaporatively cool the hot water descending over the sheets. As seen, the first air stream is shown flowing in a countercurrent fashion to the hot water sprayed downwardly. This flow direction of the first air stream is a very important to the operation of the present invention, otherwise direct section 90 will not produce uniform temperature cooling water for use in the indirect section, and that would inhibit apparatus 10 from maximizing the heat exchange capability of indirect section 50 through uniform, circuit-to-circuit operation.

The fill sheets comprising the fill bundle are hung from beams (not shown) which are connected to and traverse sidewalls 20 and 22. The beams are similar to those shown in FIG. 4, suspending the indirect section. As FIG. 8 illustrates, each sheet 93 has a generally continuous, waved pattern of grooves 99 running the entire vertical extent of the sheet and the grooves aid in spreading the hot water into a thin film, which creates additional surface area for the air to interact with and evaporatively cool. Fill sheets 93 are preferably made from a polyvinyl chloride material, although other types of plastics could be used. As determined by FIG. 2, the first air stream is strictly dedicated for evaporative cooling purposes in the direct heat exchange section before being discharged from tower 10 through roof 12.

Figure 11:
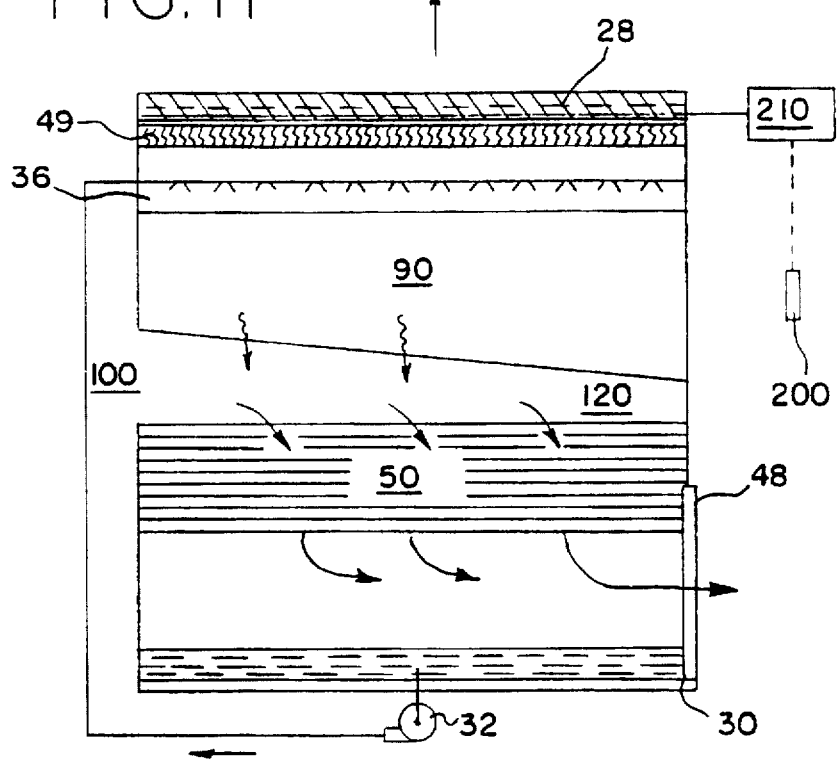
FIG. 11 shows a damper control system to prevent winter freeze-up of the preferred embodiment.

As further seen from FIG. 2, it is typical to cover roof 12 with a series of drift eliminators 49 in order to minimize the loss of recirculated water that is normally carried by the air being discharged. FIG. 11 shows that optional dampers 28 can be installed directly above the drift eliminators 49, for proportioning the air flow into the fill bundle and the tower during winter operation. Typically, dampers 28 are motorized so that they can be incrementally closed, either partially or completely. If they are completely closed, the cooling water through the direct section is also shut off, and the tower then considered to be operating as an "all-dry" tower; operation as an all-dry tower prevents winter tower freeze-up, as will be explained later when describing the freeze control systems, like the one of FIG. 11. Drift eliminator 49 is typically comprised of a series of closely spaced metal, plastic, or wood slats that permit air flow therethrough, while collecting the fine water droplets entrapped within the discharged air. The water collected by the eliminators 49 directly gravitates into the underlying fill media. Similarly, any water collected by drift eliminator 48 in the indirect section air discharge opening 17, will gravitate directly into sump 30.

FIG. 2 also illustrates that base 18 is substantially comprised of the water collection sump 30 which is disposed below the indirect evaporative heat exchange section 50 so that the heated cooling water descending through this section will be collected and then returned to the direct heat exchange section 90 for re-cooling and re-use. As seen, pump 32 is also located on base 18, but outside sump 30 and tower 10 so that it can be easily serviced in a moisture-free environment.

Spray means 36 is generally located above the fill bundle of direct evaporative cooling section 90, and FIG. 1 illustrates that it consists of identical cooling water distribution legs 38 and 40, each of which longitudinally spans the length of tower 10 in a spaced, parallel relationship from each other and from side walls 20,22. Each distribution leg 38 and 40 is preferably constructed from plastic pipe and has a series of equidistantly spaced spray nozzles 46 attached along the bottom of the pipe for evenly distributing the cooling water across the top side 91 of direct evaporative heat exchange section 90. Depending upon the heat exchange capacity required from apparatus 10, the number of water distribution legs can vary from 1 to 5 legs, with the length of each leg varying between 3–24 feet. Typically, the number of nozzles 46 per distribution means 36 will vary between 9–180 nozzles, also depending upon the tower capacity. Likewise, pump 32 is sized according to tower capacity such that a pressurized and continuous supply of cooling water is pumped to spray nozzles 46 for forming a fine spray of water across the entire span of the direct heat exchange section 90. As mentioned before, an upper drift eliminator 49 will always be interposed between roof 12 and the spray means 36. If dampers 28 are added (FIG. 11), they will have a dimensional length and width equal to that of roof 12, and for that matter, this would generally correspond to the size of the direct evaporative heat exchange section 90. As best illustrated from FIG. 2, the first air stream initially approaches the bottom edge 94 of direct heat exchange section 90 substantially normal to the top edge 97 and flows upwardly and countercurrently to the downwardly sprayed water ejected from sprays 46. The countercurrent air flow direction produces the best heat exchange interaction with the descending water per linear foot of fill bundle length, thereby providing a substantially uniform temperature of water as it exits the bottom side 92 of heat exchange section 90. To help distribute air uniformly along the full length of the entry zone and secure uniform cooling of the evaporative liquid, the fill bundle has been shaped trapezoidally. In this way, the air closest to the fan will travel over the fill bundle the shortest duration of time, while that near the front wall 16 will travel over the longest fill sheets, the greatest duration of time. Thus, if there is a slight air temperature gradient along the direction from the back wall 14 to the front wall 16, the trapezoidal shape of the fill sheets will counteract that gradient. The deeper the air penetrates into entry zone 120 and into the fill bundle, the longer the fill section has to be in order to offset increasing inlet air wet-bulb temperature; the trapezoidal configurator also helps to improve the air distribution at the inlet by eliminating a dead flow area near upper edge 103 of inlet 100.

Figure 4:
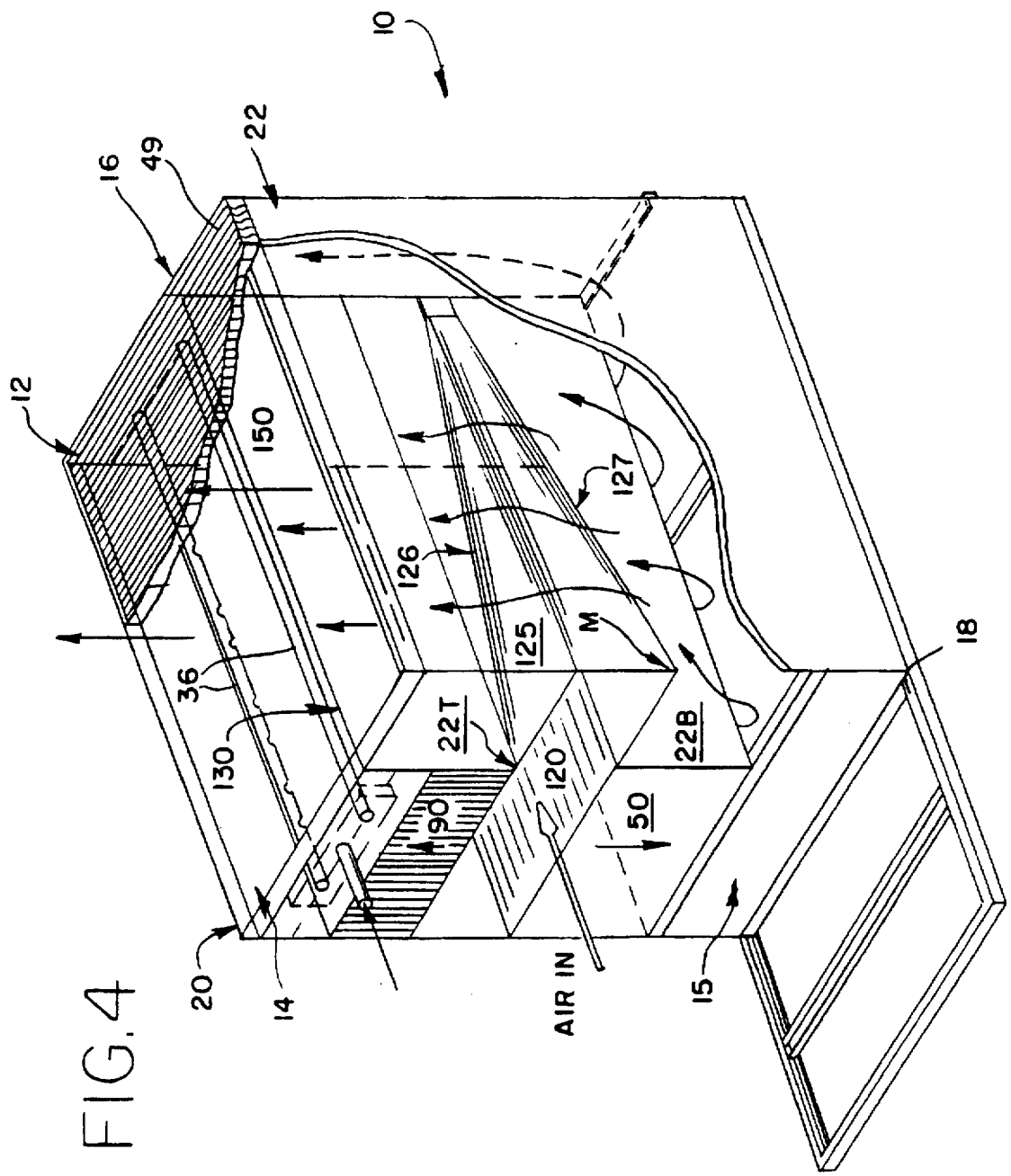
FIG. 4 is a perspective view of the interior of the present invention emphasizing the air entry zone required for higher air volume capacities.
Figure 5:
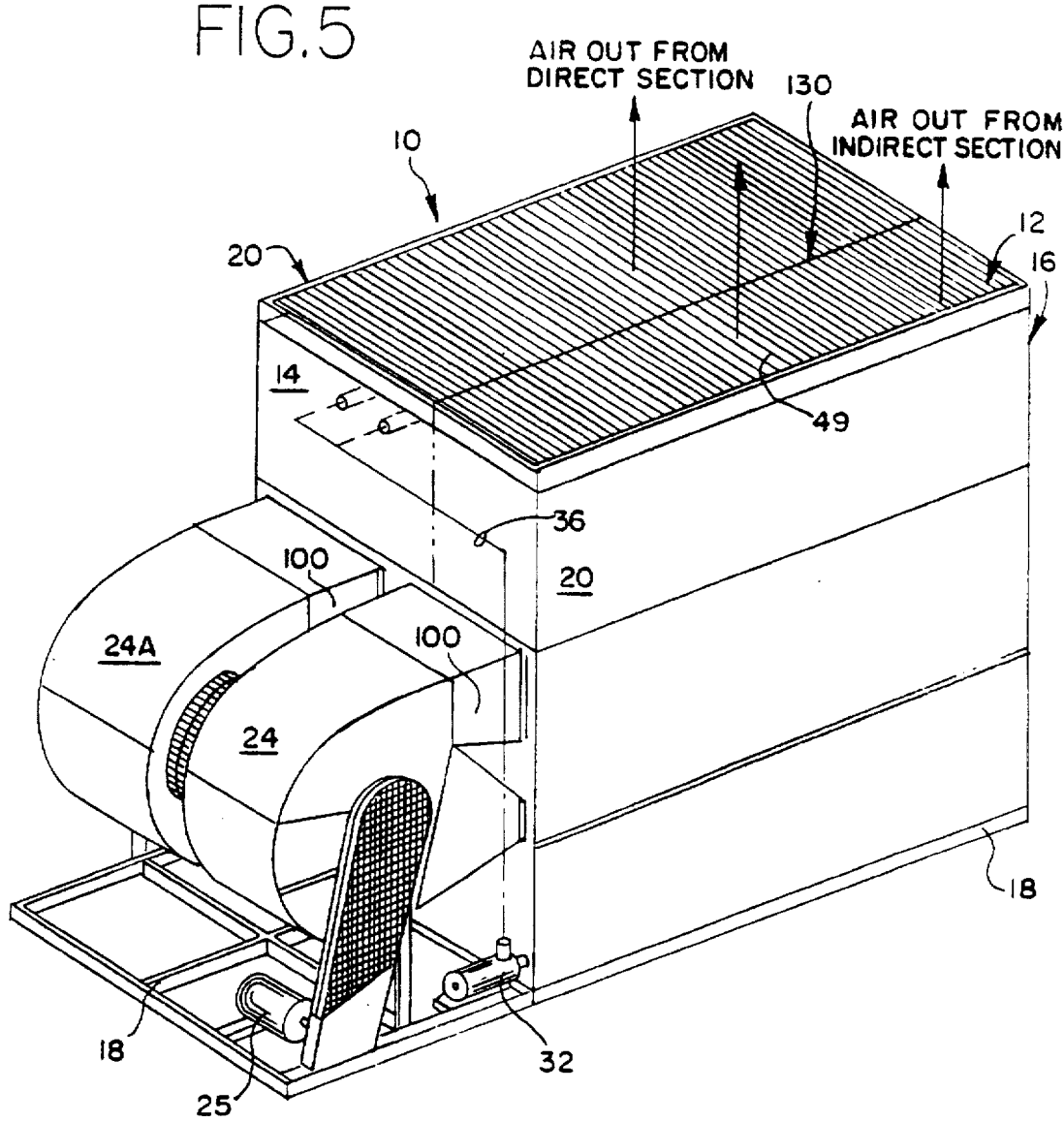
FIG. 5 is a complete external perspective view of the embodiment shown in FIG. 4.

If increased heat exchange capacity is required of the present invention, a pair of blow-through centrifugal fans can be arranged side-by-side either in a side mounted or end mounted version, as shown by FIGS. 3 and 5. For the sake of clarity, FIG. 4 is a partial cross sectional view of the apparatus of FIG. 5 with the dual fans removal in order to clearly show the internals of apparatus 10 when high air flow rates are required. The departure of the FIGS. 4 and 5 embodiments from the designs which are shown in FIGS. 1–3 are two-fold.

First, the air inlet 100 and the air entry zone 120 are enlarged and physically wider than the extent of the indirect and direct evaporative sections. In the FIGS. 4 and 5 embodiments, the purpose of widening inlet 100 and entry zone 120 is to limit excessive air velocities within entry zone 120 so that pressure losses can be minimized.

Second, the air leaving the indirect evaporative section is downward, therefore is not discharged through louvered front wall 14 as previously shown FIG. 1. Rather it travels under the indirect section into the passageway 15 and then makes a 180° turn so that it is discharged vertically along the side of the tower, where it combines with the air being discharged from the direct evaporative section, as it exits at roof 12. From an operational perspective, this arrangement is more practical since the discharge of the high velocity air at or near base 18 would interfere with a passerby, or create operational interference in some cases with other equipment or other cooling towers nearby.

Figure 6:
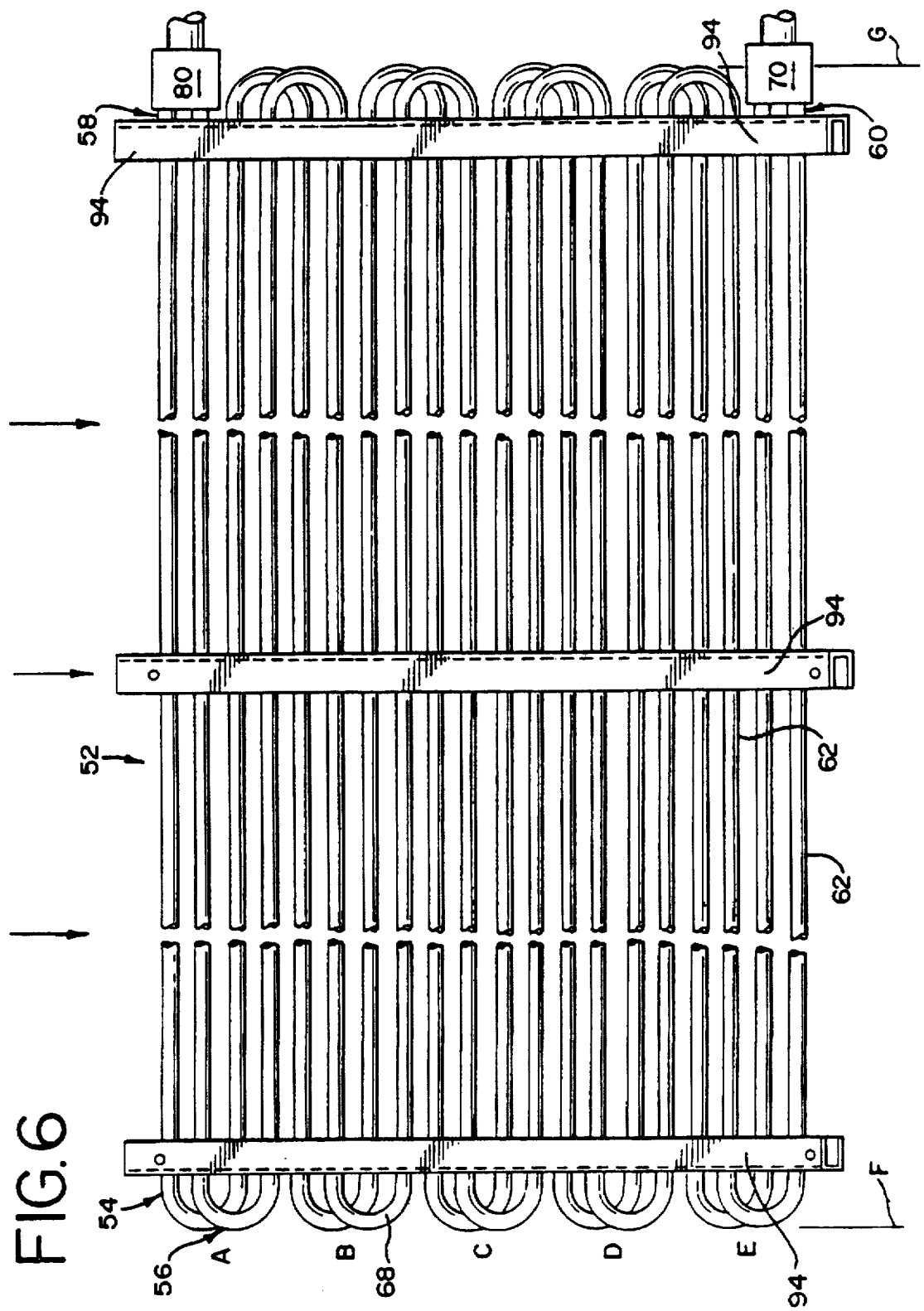
FIG. 6 is a side view of an individual circuit which comprises the indirect heat exchange section.
Figure 7:
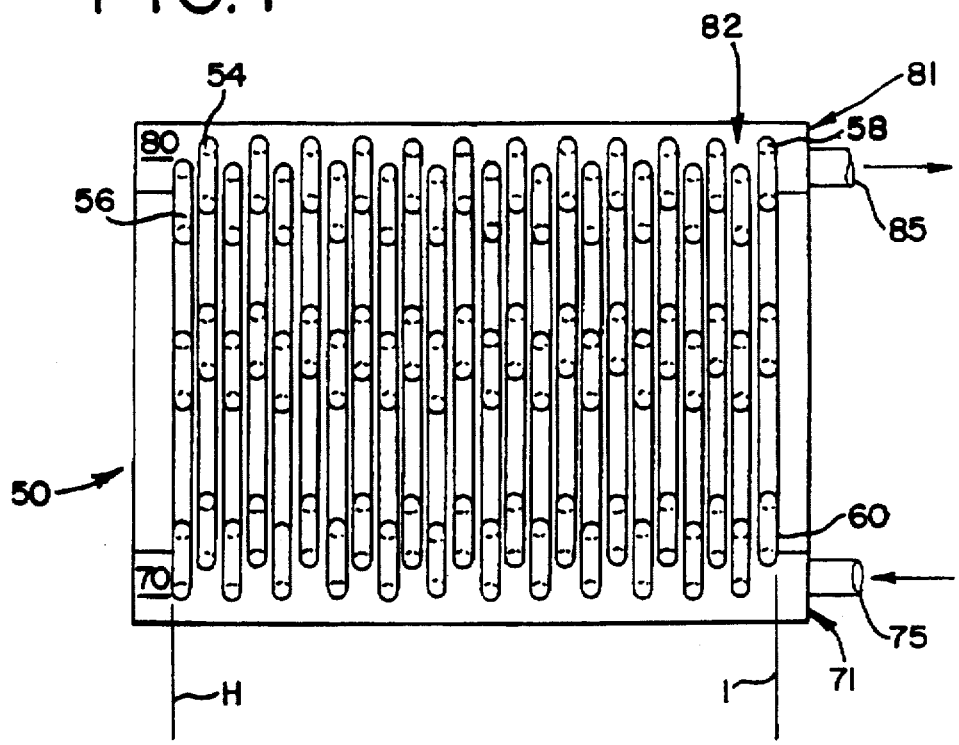
FIG. 7 is a front view of the indirect heat exchange section.

As mentioned above, a perspective view of the interior of the preferred embodiment of the present invention is shown in FIG. 4 without the fan assemblies for the sake of clarity, and it is seen that the indirect and direct evaporative heat exchange sections are placed against one of the tower side walls 20. The other side of each heat exchange section is commonly enclosed by a specially configured internal partition wall 130 which is comprised of solid walls 22T, 22B, and the converging duct 125. The air converging duct 125 not only serves as a part of the partition wall, but it also functions as a means for extending the air inlet 100 so that the air flow velocities can be reduced. In this way, larger quantities of air can be conveniently and gradually introduced into the entry zone proper (120) without developing excessive pressure gradients and frictional losses when high capacity towers are used. The converging duct 125 is shown as having a wedged configuration although the actual shape is really a function of two interrelated factors; the inlet area and the coil and fill plan area. It is preferred that the inlet area be between 80–120 percent of the fill plan area. The plan area is defined as the heat exchange surface area which will interact with the incoming air stream and perform heat exchange therewith. In this disclosure, the plan areas of the indirect and direct heat exchange sections are the same, since the cross sectional areas are also the same, as will now be determined. Referring to FIGS. 6 and 7 simultaneously, the planar cross sectional area of the indirect section is physically represented by the width of the coil assembly, multiplied by the length of the assembly. From the figures, this is the length or distance between lines F, G, multiplied by the width or distance between lines H, I.

On the other hand, the contact area is important for evaluation of the air velocity entering the entry zone. This velocity should be kept under 1000 ft/min. The contact area is defined as a combination of the area of the air inlet 100 and the area of the converging duct 125. Referring to FIGS. 1 and 2, the area of inlet 100 is the width multiplied by the height, or the distance between points J and K, multiplied by the distance between edges 101 and 103. The inlet area of the converging duct is a little more complicated to determine since the width of the duct continuously tapers. However, that area can be determined using well known engineering principles where the area would be mathematically calculated knowing that the length would be equal to that of the indirect section and the width would initially be represented by the distance between points L and M, of FIG. 4 and finally by the vertical spacing between the top of the indirect section and the bottom of direct section of the front wall. Thus, it can be appreciated that the converging duct arrangement now allows the air to penetrate entry zone 120 from two sides instead of only one.

The width of the tower 10 as a whole, will mainly be determined by the space required for the side-by-side centrifugal fans and the duct(s)125. Since the direct and indirect evaporative sections are typically designed with a smaller width than the tower structure, it is now possible to use the remaining space between each heat exchange section and sidewall 22 as a common vertical discharge plenum 150. The air exiting the indirect section 50 must first by-pass the duct 125, but after it does so, it vertically rises and eventually exits tower 10 through the same set of drift eliminators 49 at the roof 12 of the tower, combining outside tower 10 with the air discharged from the direct section. The solid walls 22T and 22B inside the apparatus 10, vertically extend the height of their respective heat exchange sections and join with duct 125 along duct edges 126 and 127. In this way, air flowing within each section cannot discharge itself through a side of the respective section. Similar partitions are common in furnace and boiler designs. An alternative design to the concept of FIGS. 4 and 5 would involve centering the direct and indirect sections between the sidewalls of the tower structure instead of along one side, as generally depicted in FIG. 10. This would require two symmetrical ducts 125 and two symmetrical partition walls 22T and 22B, in order to enclose each of the direct and indirect section sides. It should also be clear that two vertical discharge plenums would also be created, with each plenum using a common set of drift eliminators at the roof top. It should be clear too that with a centered version like that of FIG. 10, the air stream would enter both sides of entry zone 120, instead of only one. Technically, the centered design has operational advantages, but from a cost perspective, it is more expensive to incorporate the two partition walls and converging ducts into the tower. In this respect, it is envisioned that the partition wall be made of a thinner sheet metal or other material, compared to the thickness of external walls 20 or 22.

Referring now to FIGS. 6 and 7, the single coil assembly comprising the indirect evaporative cooling section 50 will now be explained in greater detail, and it should be understood that this description applies to any of the illustrated embodiments. More particularly seen in the side view of FIG. 6, the single coil assembly is preferably a generally rectangularly shaped structure comprising a series of horizontally and closely spaced parallel circuits 54 and 56 of serpentine shape. All circuits 54,56 have a circuit top end 58 and a circuit bottom end 60 connected to a top fluid header 80 and to a bottom fluid header 70, respectively. In this particular application, where apparatus 10 is being used as a fluid cooling device, bottom header 70 actually serves as the hot fluid inlet supply header and top header 80 serves as the cooled fluid outlet header. It should be understood that the supply/discharge functions of each of the headers could change, depending upon the actual use of apparatus 10, i.e., if it is being used as an evaporative condenser, the hot gas would enter indirect section at the top side 53, where top header 80 would now serve as the supply header. FIG. 6 also shows that each of the headers 70 and 80 are rectangularly shaped and both headers are usually located on the same sides or ends of the assembly. FIG. 7 illustrates that a single supply pipe 75 is connected generally to the side face 71 of inlet header 70 such that the individual inlet circuits generally are at a right angle to pipe 75. The inlet supply pipe 75 supplies the fluid to be cooled to the header 70, where the fluid is forced to flow inside the series of circuits in an upward fashion. An even flow rate through all circuits 54,56 is important to the proper operation of the indirect heat exchange section and to the overall performance of apparatus 10, since the air temperatures and water temperatures have uniform starting temperatures. Top outlet header 80 also has a single outlet pipe 85 generally attached to the side face 81 of header 80, which is in agreement with side face 71 of header 70. Pipe 85 is typically spaced directly above inlet supply pipe 75 so that the cooled fluid exiting the indirect section flows in a direction generally parallel, yet opposite in direction to the fluid entering inlet pipe 75.

FIG. 6 also illustrates that each individual circuit 54,56 is comprised of a single, continuous length of coil tubing that is subjected to a bending operation that forms the tubing into several U-shaped rows A–E. Each row is vertically spaced an equal distance from each other, thereby defining the resultant serpentine shape. Each row is also substantially the same dimensional length, with each individual row generally comprising two individual straight sections 62 unitarilly formed with a generally U-shaped bend or return section 68 at each end. By forming each row and each of the circuits 54,56 in exactly the same way, the heat load between alternating circuits 54,56 will effectively remain constant, as long as all other factors between the circuits, such as temperature and flow rates, remain equal. As FIG. 7 shows, indirect heat exchange section is constructed with five rows, A–E, but the exact number of rows will depend upon the amount of heat transfer surface area required for each particular application. That determination is made by commonly known engineering heat transfer principals and will not be discussed herein. Each of the individual rows A–E substantially spans the length of apparatus 10 between front and rear walls 16 and 14, and depending upon the overall size of the indirect section 50, as determined by its rated capacity, might require at least two structural supports 94 on each end of the rows to keep the circuits from sagging. The supports will also help to ensure proper horizontal tube spacing between individual circuits 54,56, where the figure illustrates, is substantially the same. Proper vertical and horizontal spacing promotes uniform heat transfer throughout the indirect evaporative heat exchange section.

Referring again to FIG. 6, it is clear to see that each individual circuit 54,56 is attached to the inlet and outlet headers 70,80, respectively, by inserting and attaching a circuit inlet end 60 and an outlet end 58, respectively into the front walls 72,82 of each respective inlet and outlet headers 70 and 80. The circuits are preferably welded at the tubing/header interface, although other methods of attachment, such as rolling the tubes into the header, can be used. All adjacent circuits 56 within the plurality of circuits comprising the indirect section are slightly staggered below the starting circuits 54 by about half the vertical distance between rows so that all circuits lie side-by-side in close tolerance, yet promote air infiltration. Depending upon the heat exchange capacity of apparatus 10, the number of individual circuits 54,56 can range from 23 to 56 circuits per single coil assembly. No matter how many circuits are utilized, it should be understood that the tightly spaced tolerance between individual circuits effectively forms a continuous, or uninterrupted thermal face of heat exchange surface area for contacting and interacting with the entering air and cooling water streams. In the operation of this particular invention, the physical arrangement of the individual circuits comprising the indirect cooling section 50 and the direction of the fluid therein, are factors which will help attain maximization of the cooling efficiencies of each heat exchange section 50 and 90, and of apparatus 10 as a whole, as will now be explained.

The continuous operation of the apparatus shown in FIG. 1 as a single phase fluid cooler will now be described, and it should be realized that the embodiments of FIGS. 3–5 will operate the same. The embodiments of FIGS. 9 and 10 generally perform the same way too, except that the air flow through the tower will be slightly modified, as will be specifically explained. Operationally, hot fluid to be cooled is supplied to header 70 at the bottom side 55 of single coil indirect heat exchange section by supply pipe 75. The hot fluid evenly distributes itself within header 70 and into each of the attached, staggered pairs of individual circuits 54,56 so that fluid flows upwardly at a substantially uniform flow rate within the entire series of circuits. As the fluid moves upward, it effectively moves as a continuous plane or sheet of fluid until all of the tubing runs 62 on each of the top rows A, which define top side 53, are equally exposed to a simultaneous contact with the second air stream derived from air entry zone 120, and to the uniform temperature of cooling water draining downwardly from direct section 90. As mentioned before, fan 24 pressurizes the ambient air stream which entered entry 120 such that it is forced to flow into the indirect section at an angle substantially perpendicular to the top side 53 of the indirect section. Likewise, the coldest available cooling water from direct evaporative section 90, is falling by gravity generally across top side 53 of indirect heat exchange section 50. As previously mentioned, when the cooling water descends from bottom fill edge 98 of fill bundle 92, its temperature is uniform along the longitudinal length of direct section 90. It should be pointed out that the overall heat exchange capacity of apparatus 10 will not be noticeably affected even if the air streams do not split into a generally 50—50 division. By that it is meant that even if 60 percent of the entering air volume was directed into the direct section, the capacity would not change much. Beyond those proportions, the changes in performance will be more significant. Generally speaking, the pressure losses along each air path through the direct and indirect section will determine the split ratio of the incoming air into the entry zone. In principle, 50—50 division is targeted, but actual designs may depart from such division to accommodate particular design requirements.

Since the entire series of circuits initially experiences a uniform temperature of cooling water and a uniform temperature air stream, the temperature of the fluid within the circuits is substantially constant across the entire series of circuits at any given horizontal or vertical location within the coil assembly. This means that the air and water flow streams absorb heat uniformly as they progress downwardly through the indirect section, thereby causing the fluid within the circuits to substantially undergo an equal rate and quantity of heat exchange from circuit to circuit. By this, it is not meant that the air and water streams are each absorbing the same amounts of heat, for it is known that the water will absorb substantially far greater amounts of heat than the air, thereby performing a substantially greater role in affecting the uniformity of heat exchange performance. This point is reinforced by the unequal divisions in the air streams which can be tolerated before performance is effected. Thus, it is appreciated that each of the cooling mediums will independently absorb heat at a constant rate from circuit to circuit at any horizontal or vertical location within the indirect heat exchange section 50. The uniformity of performance throughout the vertical and horizontal directions of the indirect heat exchange section 50 is most important towards maximizing the heat exchange capacity of the apparatus. An added feature of this particular embodiment is that the concurrent air flow pattern boosts the maximization and uniformity of heat exchange from circuit to circuit due to the concurrent flow direction not forming temperature gradients like a cross flow pattern would. FIG. 3 shows a slightly modified embodiment to that of FIG. 1, and is capable of receiving more air flow since there are two fans 24,24A, mounted in the side wall 22. This version also emphasizes that as long as the air flow direction in the indirect section is maintained in a concurrent direction with the water, and if an initially uniform starting temperature of cooling water is used in this section, the heat being exchanged will be maximized. The uniform temperature evaporative liquid is preserved since the fill sheets faces 95 of the direct section 90 remain parallel to the incoming ambient air entering the air inlet 100, which extends from fan-to-fan. This figure also shows that if desirable, the air being discharged from indirect section 50 can be vertically discharged up plenum 150. Plenum 150 could easily be made part of the structure of apparatus 10 by extending the front, back, and sidewall, such as shown at 16E, 14E and 20E, in order to form plenum 150. If plenum 150 is added, the drift eliminator 48, which is shown extending along the bottom of wall 20, would be eliminated. Instead, drift eliminators 49 in roof 12 would be extended to also cover plenum 150.

With this basis, it is easy to understand how the entire top row of circuits will contain the coldest fluid to be cooled when the fluid reaches top side 53 for contact with the coldest entering air and water. Since the water dominates the removal of heat, the coldest available cooling water contacting the circuits causes the temperature of the fluid within the circuits to nearly approach that of the cooling water. The concurrently flowing air stream, being free of temperature gradients at any particular elevation, evaporatively cools the cooling water as both mediums continue their downward travel through the indirect heat exchange section 50, causing the air to exit at a uniform temperature. That feature becomes critical towards maximizing the performance of the apparatus when it is operated as a wet-air cooler.

A key feature of the present apparatus is that it also maximizes the use of precious space in that only one air inlet is present, thereby eliminating the need for a true plenum space. For the sake of this discussion, a plenum space is defined as the large, open area within a cooling tower in which the heated air enters before exiting the tower. Minimizing the size of plenum space area is important because a plenum is considered "dead space", which adds substantial costs to incorporate it into a taller and larger tower. Since cost is a very important factor in the sale of such apparatus, maximizing the efficiencies and uniformities of each cooling section within the smallest amount of physical space, offers the customer lowest initial construction costs. Although the high capacity towers shown in FIGS. 4 and 5 require a vertical narrow plenum 150, it should be appreciated that the single, compact air inlet allows the tower 10 to be much smaller than those known in the art, and this means that the plenum will be much smaller too.

In FIG. 3, all of the inventive features discussed in the previous embodiment of the present invention have been maintained in this embodiment, even though as this design represents a higher capacity apparatus which requires two fans to blow air in through the tower side 22. As seen, the indirect section 50 is still provided with uniform temperature water from direct section 90 since it uses a counterflow air flow. It is also clear that the air and water flow streams will still contact all of the circuits along top side 53 of indirect section 50, making this embodiment function essentially no different from the FIG. 1 embodiment. The only difference with this embodiment is that the circuits 52,54 and the fill sheets 92 are oriented to extend between sidewalls 20,22 instead of between front and back walls 14,16. The circuits 52,54 are also perpendicular or normal to the air inlet 100.

While the invention has been described in connection with the tower being used as a fluid cooling device, one skilled in the art should also appreciate that the invention is not so necessarily limited, and that this invention could also be used as an evaporative condenser and as a wet-air cooler, as will now be described below. Since each component of apparatus 10, when used as an evaporative condenser or wet-air cooler, is exactly the same as when used as a fluid cooler, the same reference characters and nomenclature will be used in describing either of the alternate modes of operation.

When the embodiment of FIGS. 1 or 3 are used as an evaporative condenser, they perform substantially the same way as when apparatus 10 is used as a fluid cooler, except that instead of a cooled fluid leaving top header 80 through pipe 85, pipe 85 is used for supplying a superheated vapor such as a hot refrigerant gas to the indirect heat exchange section 50 for cooling; the cooling process now condenses the hot refrigerant gas back to a liquid state. The gas enters header 80 for uniform distribution to all of the individual conduits 54,56 connected to header 80. As before, the coldest available air entering primary air inlet 100 and the coldest uniform temperature water draining downwardly from direct section 90 contacts the hottest available gas stream entering conduits 54,56, thereby providing the most efficient and effective use of each cooling medium for condensing the gas. As explained earlier with the fluid cooler operations, the evaporative water that is descending and being heated through vapor condensing section 50, is partially cooled in the indirect section through evaporative heat exchange with the entering air, and is further cooled by direct evaporative heat exchange with the second air stream flowing within the direct evaporative heat exchange section 90. As before, the hot evaporative liquid is gathered in sump 30 for redistribution by pump 32 to distribution means 36 for recirculation across the direct heat exchange section 90. As for the heated air streams, the direct section air stream is discharged to the atmosphere through roof 12, while the indirect section air stream is discharged out front wall 16, or it can be directed into a vertical plenum space and then ultimately discharged with the hot air from the direct section, as shown in FIGS. 4 and 5.

Uniform circuit to circuit performance is even more important when operating apparatus 10 as an evaporative condenser because uniformity of performance ensures that the circuits of the indirect section will not experience uneven condensing performance. For example, if the circuits closest to the inboard side 51 of the indirect heat exchange section are exposed to a colder evaporative liquid than the circuits on the outboard side 57, then the inboard circuits are capable of condensing greater amounts of vapor. The increased capacity in the inboard circuits causes an increase in pressure drop through these circuits. Since the inlets and outlets of each circuit are connected to common headers, the overall pressure drop across all circuits must be identical. Therefore, liquid will back up in the inboard circuits in order to create a balancing liquid head to compensate for the extra frictional pressure drop in these circuits. When liquid backs up, it causes a decrease in performance due to the reduction of coil surface available for condensing. Although, this form of operation is common in prior art condensers, is undesirable because it causes less than 100 percent utilization of the available condensing surface and decreases the rated output of the apparatus. After the desuperheated gas is condensed into a liquid, it is collected in lower header 70 and then discharged via piping 75 for use in the offsite process again.

When used as a wet-air cooler, the first and the second air streams will flow in the same directions as previously described; concurrent in the indirect section and countercurrent in the direct section. However, the object of apparatus 10, is now to cool the warm air stream entering the indirect heat exchange section for use at another location. Instead of containing a hot fluid to be cooled, each of the series of circuits 54,56 now contain an initially chilled fluid which is supplied from an off-site process. In lieu of a chilled fluid the circuits could also contain an evaporating multi phase refrigerant. The chilled fluid enters from the bottom side 55 of indirect section 50 as before, entering supply header 70 and flowing upwardly as a continuous plane of generally uniformly increasing temperature fluid. As the evaporative liquid flows down over the circuits, heat is simultaneously added from the concurrently flowing initially warm air stream and removed to the counter flowing chilled fluid steam within the circuits 54,56. More heat is removed than added to the evaporative liquid, therefore, its temperature is decreased as it flows downwardly though the indirect heat exchange section. The relatively warmer air stream entering the indirect section contacts the circuits and is cooled by the fluid stream therein. Likewise, the chilled fluid within circuits 54,56 absorbs heat from the evaporative liquid, causing the fluid to become heated as it reaches the top side 53 of indirect section 50. The heated fluid enters top header 80 before returning to the off-site process through return piping 85, while the primary air stream exits the indirect section 50 through opening 17. The now-cooled evaporative liquid is then distributed across the direct heat exchange section 90 where it directly contacts and exchanges heat with an initially warm countercurrently flowing secondary air stream passing there through. The temperature of the evaporative liquid actually increases as it passes downwardly through the direct section. When it enters the indirect heat exchange section it gets cooled, simultaneously exchanging heat with the second air stream. This now cooled second air stream is discharged through opening 17 for use at a separate off-site location, such as for a mining, vegetable cooling, or gas turbine air inlet precooling operation.

Turning now to FIGS. 9 and 10, another embodiment of the present invention is shown whereby many of the features of the previous embodiments are incorporated. The main difference between these two embodiments and previously described ones is found in the type of means used for moving air through the apparatus 10. As shown in both figures, fan 24 now is a propeller fan mounted on roof 12. This means that a single air entry for both sections could also be used with the induced draft fan operation. The fan assembly is now exposed to the hot, moist discharged air, necessitating use of a more costly fan. This also means that entry zone 120 will be operating under vacuum instead of positively pressurized. Putting those differences aside, the towers of FIGS. 9 and 10 will still preserve the physical arrangement of all the components, as well as the air and water flow directions; the exception being that the air will be pulled (induced draft) through the heat exchange sections instead of pushed (forced draft). FIG. 10 generally shows the design of FIG. 9 with the direct and indirect sections being centered within apparatus 10, between side walls 20 and 22. This arrangement is used when very high heat exchange capacities are required. As explained earlier, the size of converging duct(s) 125 is a function of the physical size of the heat exchange sections and discussion of this aspect will not be provided. Further discussion of the differences between the single vertical plenum tower of FIG. 9 and the double vertical plenum of FIG. 10 will also not be discussed since these embodiments only differ from the forced draft fan embodiments in how the entry zone 120 is pressurized. Thus, it should be understood that the heat exchange sections of the FIGS. 9 and 10 designs will also be operating under a negative pressure.

Figure 12:
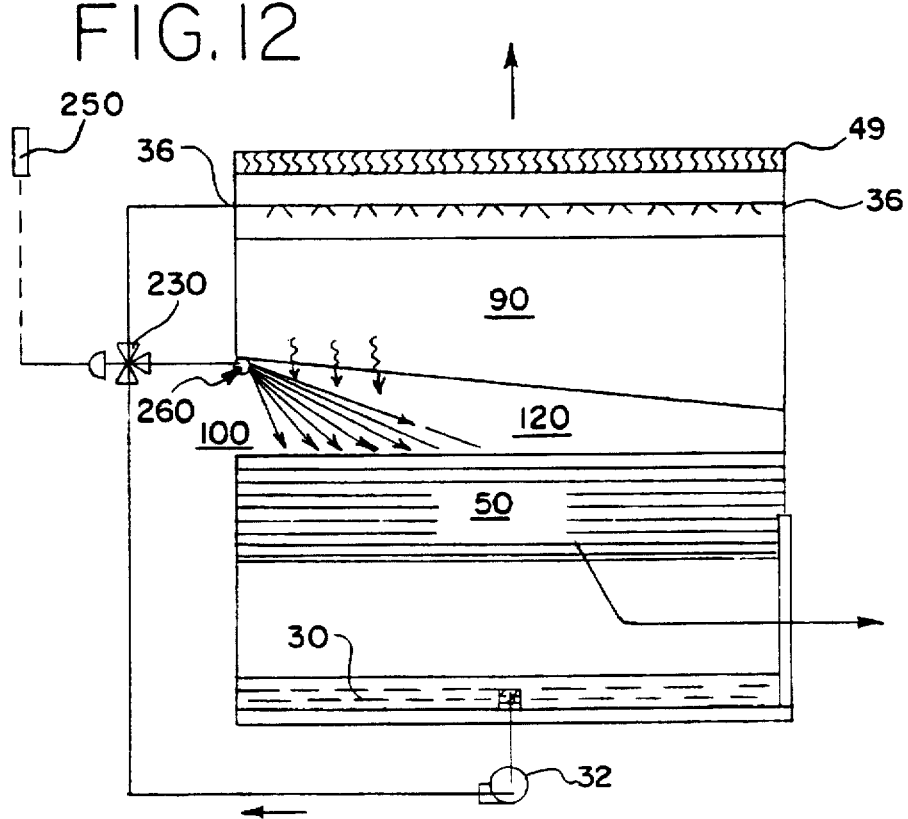
FIG. 12 shows a warm water spray control system for preventing winter freeze-up of the preferred embodiment.
Figure 13:
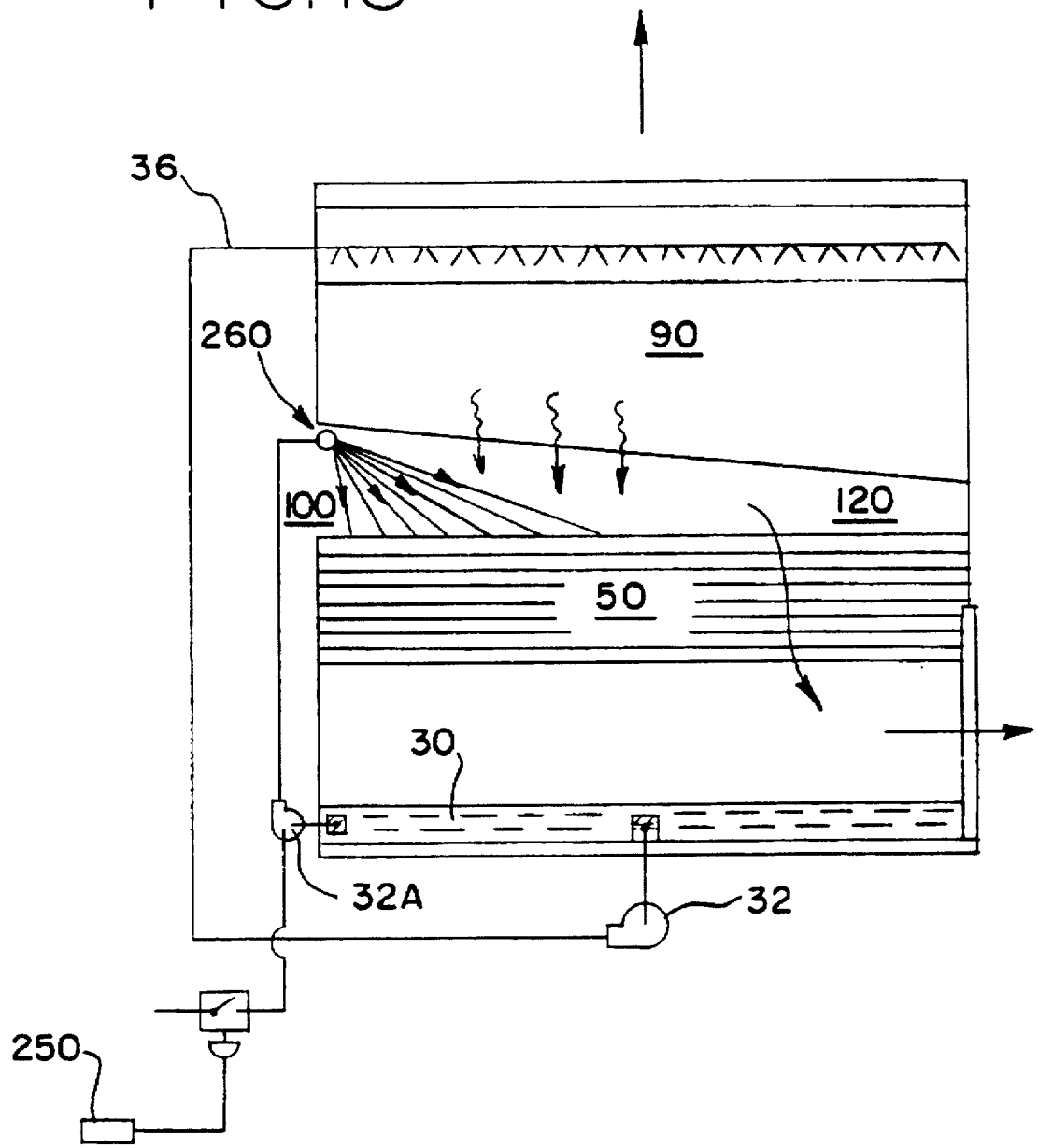
FIG. 13 shows another warm water spray system for preventing winter freeze-up, incorporating a separate, auxiliary water pump.

Pursuant to the present invention, provision has also been made to control winter freeze-up of the recirculated evaporative liquid (commonly water), as shown in FIGS. 11, 12 and 13. In general, all evaporative heat exchangers are usually protected in some way against the possibility of freeze-up or icing. The present invention may be sensitive to freeze-up during cold weather because the incoming ambient air is in direct contact with the coldest water exiting from the direct evaporative heat exchange section. If the apparatus is in an idle mode for some reason, then the sump water temperature is typically maintained above freezing by submerging electric or steam heaters therein.

However, when the apparatus is operating during outdoor temperatures below 32° F. (0° C.), the following methods can be employed to control or prevent icing. The easiest method is to regulate the amount of air flow delivered from the fans. If the air flow is reduced, the operating water temperature increases. This is usually accomplished by modulating capacity control dampers (not shown) which are optionally installed at the fan discharge. If fan control of air flow through the direct evaporative section by means control dampers are not present, the motorized dampers 28, placed on the top of structure 10, above the drift eliminators, can be closed incrementally to control air flow through only the direct heat exchange section. FIG. 11 illustrates that when the outdoor temperature drops, the temperature sensor 200 sends the signal to the damper motor 210, which then closes the dampers 28 incrementally, thereby decreasing the air flow through the direct section 90. The cooling of the evaporative liquid (water) in the direct section will then be greatly reduced. Therefore, warmer water will exit the direct section, thereby preventing the icing of the indirect section. Since the winter ambient temperatures help the overall heat exchange capacity of tower 10, the warmer water will adversely effect the heat capacity. The air flow control through the direct section may also be combined with a fan control damper, if one is provided. FIG. 12 shows another method where warm sump water is sprayed into the air entry zone 120 as the means to prevent freezing. As mentioned, the thermal capacity of the indirect section may be much larger than actually required during the winter season. At such times, the use of direct evaporative section may even be found unnecessary and shut down so that the tower is operated dry. In principle, a small amount of recirculated water from the sump can be directed to a second set of sprays located above the indirect section. The recirculating pump 32 would provide water through a three-way valve 230 which is controlled to open by an outdoor thermostat 250. A single spray header 260 at the air entry 100 would spray the warm water from the sump to preheat the incoming cold air within entry zone 120 and the cold water exiting from the direct section. This would produce a mixed water temperature condition within entry zone 120, thereby preventing the icing of the indirect section and the bottom of the direct section. Finally, FIG. 13 shows an alternative to the concept shown in FIG. 10, wherein a separate recirculating pump 32A is used to supply warm water from the sump 30 into the air entry zone 120 through the same spray header 260. The function of this system is the same as described immediately above, with the auxiliary pump 32A also being activated by the outdoor thermostat 250 sending a signal to electrical contacts in pump starter 270, which would then close and energize pump 32. It should be noted that the use of warm sump water as a freeze protection method could also be incorporated into any of the embodiments provided with propeller fans too (FIGS. 10 and 11).

The foregoing description has been provided to clearly define and completely describe the present invention. Various modifications may be made without departing from the scope and spirit of the invention which is defined in the following claims.

I claim:

1. In a heat exchange apparatus, a method of exchanging heat comprising the steps of:

providing a direct evaporative heat exchange section and an integral indirect evaporative heat exchange section, said indirect section conducting a fluid stream within a plurality of individual circuits comprising said indirect section, and said direct section comprised of a fill bundle each of said heat exchange sections having a top side, a bottom side, an inboard side, an outboard side, an air inlet and an air outlet, said inboard and outboard side of each said heat exchange section defining a respective direct and indirect heat exchange section width, said direct and indirect heat exchange section widths being substantially equal;

placing said direct section above said indirect section;

providing a means above said direct section top side for spraying an evaporative liquid generally downwardly across said direct section;

passing said evaporative liquid from said direct section downwardly across said individual circuits of said indirect evaporative heat exchange section in order for said liquid to indirectly exchange heat with said fluid stream within said circuits;

providing at least one means for moving an ambient stream of air into a air inlet of said apparatus, said inlet having a horizontal extent and a vertical extent, said air inlet in communication with an air entry zone common to each of said heat exchange sections;

splitting said air stream within said entry zone into a first air stream and a second air stream, said first air stream flowing upwardly into said direct heat exchange section air inlet, which said inlet is associated with said bottom side of said direct section, and said second air stream flowing downwardly into said indirect heat exchange section air inlet, which said inlet is associated with said top side of said indirect section, said first air stream flowing countercurrent with said evaporative liquid within said direct section and said second air stream flowing concurrent with said evaporative liquid within said indirect section, said first air stream evaporatively exchanging heat with said evaporative liquid in said direct section before exiting said air outlet, which said outlet is associated with said top side of said direct section, said second air stream evaporatively exchanging heat with said evaporative liquid in said indirect section before exiting said air outlet, which said outlet is associated with said bottom side of said indirect section;

collecting substantially all of said evaporative liquid exiting said indirect section in a sump;

pumping substantially all of said collected evaporative liquid upwardly to said direct evaporative heat exchange section for redistribution; and enclosing said sump, said spray means, and each of said heat exchange sections within a single structure, said structure having a generally open roof above said spray means, a generally solid base for containing said sump, a from wall, a near wall, and a pair of side walls interconnecting with said roof, base and front and rear walls.

2. The method of claim 1 wherein said fill bundle includes a plurality of fill sheets, having side edges and a face therebetween, the method further comprising the step of arranging said fill sheets of said direct section fill bundle such that said air stream flowing into said air entry zone is parallel to each of said fill sheet faces.

3. The method of claim 2 further comprising the step of providing a passageway under said indirect section, said passageway receiving said second air stream exiting said section, said passageway facilitating discharge of said air stream from said apparatus.

4. The method of claim 3 further comprising the step of providing at least one vertical plenum in communication with said passageway, said vertical plenum extending upwards within said structure from said passageway to said roof.

5. The method of claim 4 further comprising the step of arranging said individual circuits of said indirect heat exchange section such that said fluid stream flows into each of said circuits in a same direction as said ambient air stream flowing into said air entry zone.

6. The method of claim 3 further comprising the step of placing said fan means outside said apparatus structure such that a discharge of said means is in communication with said air inlet, said means causing said air stream within said entry zone to have a pressure greater than a pressure of said ambient air.

7. The method of claim 5 further comprising the step of placing said fan means within said apparatus roof such that said air inlet is generally open to generally receive ambient air from outside said structure and is in communication with said entry zone and a discharge of said means is generally in communication with said opening in said roof, said means causing said air stream within said entry zone to have a pressure less than a pressure of said ambient air.

8. The method of claim 3 further comprising the step of arranging said individual circuits of said indirect heat exchange section such that said fluid stream flowing within said circuits flows in a direction generally parallel to said side walls.

9. The method of claim 4 further comprising the step of placing said fan means outside said apparatus structure such that a discharge of said means is in communication said air inlet, said means causing said air stream within said air entry zone to have a pressure greater than a pressure of said ambient air.

10. The method claim 9 further comprising the step of placing said air inlet in one of said side walls, wherein said ambient air stream flowing into said air inlet is normal to said fluid stream within said circuits.

11. The method of claim 10 further comprising the step of providing at least one vertical plenum in communication with said passageway, said vertical plenum extending upwards within said structure from said passageway to said roof.

12. The method of claim 1 wherein said fill bundle contains a plurality of fill sheets, each of said fill sheets having a short side edge, a long side edge, and a face therebetween.

13. The method of claim 1 wherein said horizontal extent of said inlet is at least as wide as said width of either of said heat exchange sections.

14. The method of claim 1 wherein said means for moving an ambient stream of air pressurizes said air stream within said air entry zone with ambient temperature air.

15. The method of claim 1 wherein said air inlet is a solitary inlet.

16. An apparatus for exchanging heat comprising:

a structural enclosure, said enclosure having a generally open roof, a base, a front wall, a rear wall, and a first and second side wall interconnecting with said front and back walls and said roof and base, said structure including an air inlet having a horizontal extent;

a direct evaporative heat exchange section above an integral indirect evaporative heat exchange section, each of said heat exchange sections separated by a common air entry zone in communication with said air inlet, each of said heat exchange sections having a top side, a bottom side, an inboard side, an outboard side, an air inlet and an air outlet, said inboard and outboard side of each of said heat exchange sections defining a respective direct and indirect heat exchange section width, each said heat exchange section width being substantially equal to each other and to said horizontal extent of said air inlet, said integral indirect evaporative heat exchange section including a plurality of individual circuits for conducting a fluid stream within said circuits, said direct evaporative heat exchange section including a fill bundle;

at least one means to move an ambient stream of air into said air inlet and into said air entry zone of said structure, wherein said air stream is split into a first stream and a second stream, said first air stream upwardly entering said direct section and said second air stream downwardly entering said indirect section, each respective said air stream evaporatively exchanging heat with an evaporative liquid flowing within each respective said heat exchange section, said indirect heat exchange section air inlet associated with said top side of said indirect section and communicating with said air entry zone, said indirect heat exchange section air outlet associated with said bottom side of said section, said indirect heat exchange section air stream flowing concurrent with said evaporative liquid therein, and said direct heat exchange section air inlet associated with said bottom side of said direct section and communicating with said air entry zone, said direct heat exchange section air outlet associated with said top side of said section and said roof, said direct heat exchange section air stream flowing countercurrent with said evaporative liquid therein;

means for downwardly spraying said evaporative liquid over said fill bundle of said direct section before said liquid gravity drains into said indirect heat exchange section;

a sump for collecting substantially all of said evaporative liquid after said evaporative liquid is distributed downwardly;

a pump for pumping substantially all said collected evaporative liquid upwardly for redistribution to said direct heat exchange section.

17. The heat exchange apparatus of claim 12 wherein said fill bundle comprises a plurality of individual fill sheets, each of said sheets having a short side edge, a long side edge, and a face therebetween, and wherein said direct and indirect heat exchange sections, said spray means, said sump and said passageway are enclosed within said structural enclosure, said fill sheets arranged such that said air stream flowing into said entry zone is parallel to each of said fill sheet faces.

18. The heat exchange apparatus of claim 17 wherein said indirect heat exchange section further includes a top fluid header and a bottom fluid header, each of said top and bottom fluid headers operationally associated with respective said top and bottom of said indirect heat exchange section, each said fluid header having a pipe attached to a corresponding side face of said respective header in vertically spaced general congruency to each other, said top and bottom fluid header pipes communicating said fluid stream into and out of said top and bottom fluid headers.

19. The heat exchange apparatus of claim 18 wherein said plurality of circuits is comprised of individual circuits arranged in a series, each of said circuits within said series including a inlet end and an outlet end, one of said inlet and outlet ends connected to one of said top and said bottom fluid headers and the other of said inlet and outlet ends connected to the other of said top and said bottom fluid headers, each of said circuits communicating said fluid stream between said fluid headers.

20. The heat exchange apparatus of claim 19 wherein said fluid stream enters one of said top and said bottom fluid header pipes and exits the other of said top and bottom fluid header pipes, said entering and exiting fluid streams flowing in generally parallel and opposing directions with respect to each other, said fluid stream flowing between said fluid headers within each of said individual circuits at a substantially uniform flowrate from circuit to circuit.

21. The heat exchange apparatus of claim 20 wherein said evaporative liquid has an initial temperature when distributed across each of said individual circuits at said top of said indirect heat exchange section and a final temperature when draining from each of said circuits adjacent said bottom of said section.

22. The heat exchange apparatus of claim 21 wherein said initial evaporative liquid temperature is uniform from circuit to circuit and is substantially equal to an exit temperature of said evaporative fluid exiting said direct heat exchange section.

23. The heat exchange apparatus of claim 22 wherein said final temperature of said evaporative liquid is substantially uniform from circuit to circuit after said evaporative liquid has traveled downwardly along each of said individual circuits of said indirect heat exchange section, said final temperature relatively higher than said initial temperature.

24. The heat exchange apparatus of claim 23 wherein each of said individual circuits within said indirect heat exchange section is comprised of a tubing conduit of continuous serpentine shape, said serpentine shape defining an array of vertically aligned and generally U-shaped rows, each of said rows of generally equal length and successively spaced from each other a generally equal vertical extent, each of said rows connected together by a generally U-shaped tube.

25. The heat exchange apparatus of claim 24 wherein every other individual circuit within said series of circuits is vertically offset about half said vertical extent between said U-shaped rows.

26. The heat exchange apparatus of claim 25 further including at least one vertical plenum in communication with said passageway, said vertical plenum extending upwards within said enclosure to said roof.

27. The heat exchange apparatus of claim 26 wherein said individual circuits are arranged such that said fluid stream flows into each circuit in a same direction as said ambient air into said entry zone.

28. The heat exchange apparatus of claim 27 wherein said means to move air is located outside said structural enclosure such that a discharge of said means is in communication with said solitary inlet, said means causing said air stream within said entry zone to have a pressure greater than a pressure of said ambient air.

29. The heat exchange apparatus of claim 27 wherein said means to move air is located in said apparatus roof such that said air inlet is generally open to receive said ambient air from outside said apparatus and is in communication with said air entry zone and a discharge of said means is generally in communication with said opening in said roof, said means causing said air stream within said entry zone to have a pressure less than a pressure of said ambient air.

30. The heat exchange apparatus of claim 25 wherein said individual circuits of said indirect section are arranged such that said fluid stream flowing within said circuits flows in a direction generally parallel to said side walls.

31. The heat exchange apparatus of claim 30 wherein said means for moving air is located outside said enclosure structure such that a discharge of said means is in communication with said air inlet, said means causing said air stream within said entry zone to have a pressure greater than a pressure of said ambient air.

32. The heat exchange apparatus of claim 31 wherein said air inlet is located in one of said side walls, wherein ambient air flows into said air inlet normal to said fluid stream within said circuits.

33. The heat exchange apparatus of claim 32 further including at least one vertical plenum in communication with said passageway, said vertical plenum extending upwards within said structural enclosure from said passageway to said roof.

34. The heat exchange apparatus of claim 33 wherein said fluid stream is comprised of a single phase fluid, said fluid stream entering each of said individual circuits through said bottom fluid header as a hot fluid and flowing upwardly at a generally uniform flow rate and generally uniformly decreasing temperature before exiting from said circuits into said top fluid header as a cooled fluid.

35. The heat exchange apparatus of claim 33 wherein said fluid stream is comprised of a multi-phase fluid, said fluid stream entering each of said individual circuits through said top fluid header as a hot gas and flowing downwardly at a generally uniform flow rate and generally uniformly decreasing temperature before exiting from said circuits into said bottom fluid header as a condensed liquid.

36. The heat exchange apparatus of claim 33 wherein said fluid stream is comprised of a single phase fluid, said fluid stream entering each of said individual circuits through said bottom fluid header as a chilled fluid and flowing upwardly at a generally uniform flow rate and generally uniformly increasing temperature before exiting from said circuits into said top fluid header as a warm fluid.

37. The heat exchange apparatus of claim 33 wherein said fluid stream is comprised of a multi-phase fluid, said fluid stream entering each of said individual circuits through said top fluid header as a mixture of a cold gas and a liquid, said mixture flowing downwardly at a generally uniform flow rate and generally uniformly decreasing temperature before exiting from said circuits into said bottom fluid header as a saturated vapor.

38. The heat exchange apparatus of claim 29 wherein said fluid stream is comprised of a single phase fluid, said fluid stream entering each of said individual circuits through said bottom fluid header as a hot fluid and flowing upwardly at a generally uniform flow rate and generally uniformly decreasing temperature before exiting from said circuits into said top fluid header as a cooled fluid.

39. The heat exchange apparatus of claim 29 wherein said fluid stream is comprised of a multi-phase fluid, said fluid stream entering each of said individual circuits through said top fluid header as a hot gas and flowing downwardly at a generally uniform flow rate and generally uniformly decreasing temperature before exiting from said circuits into said bottom fluid header as a condensed liquid.

40. The heat exchange apparatus of claim 29 wherein said fluid stream is comprised of a single phase fluid, said fluid stream entering each of said individual circuits through said bottom fluid header as a chilled fluid and flowing upwardly at a generally uniform flow rate and generally uniformly increasing temperature before exiting from said circuits into said top fluid header as a warm fluid.

41. The heat exchange apparatus of claim 29 wherein said fluid stream is comprised of a multi-phase fluid, said fluid stream entering each of said individual circuits through said top fluid header as a mixture of a cold gas and a liquid, said mixture flowing downwardly at a generally uniform flow rate and generally uniformly decreasing temperature before exiting from said circuits into said bottom fluid header as a saturated vapor.

42. The heat exchange apparatus of claim 28 wherein said fluid stream is comprised of a single phase fluid, said fluid stream entering each of said individual circuits through said bottom fluid header as a hot fluid and flowing upwardly at a generally uniform flow rate and generally uniformly decreasing temperature before exiting from said circuits into said top fluid header as a cooled fluid.

43. The heat exchange apparatus of claim 28 wherein said fluid stream is comprised of a multi-phase fluid, said fluid stream entering each of said individual circuits through said top fluid header as a hot gas and flowing downwardly at a generally uniform flow rate and generally uniformly decreasing temperature before exiting from said circuits into said bottom fluid header as a condensed liquid.

44. The heat exchange apparatus of claim 28 wherein said fluid stream is comprised of a single phase fluid, said fluid stream entering each of said individual circuits through said bottom fluid header as a chilled fluid and flowing upwardly at a generally uniform flow rate and generally uniformly increasing temperature before exiting from said circuits into said top fluid header as a warm fluid.

45. The heat exchange apparatus of claim 44 wherein said fluid stream is comprised of a multi-phase fluid, said fluid stream entering each of said individual circuits through said top fluid header as a mixture of a cold gas and a liquid, said mixture flowing downwardly at a generally uniform flow rate and generally uniformly decreasing temperature before exiting from said circuits into said bottom fluid header as a saturated vapor.

46. The heat exchange apparatus of claim 12 wherein said fill bundle contains a plurality of fill sheets, each of said fill sheets having a short side edge, a long side edge, and a face therebetween.

47. The heat exchange apparatus of claim 12 wherein said air inlet is a solitary inlet.

48. The heat exchange apparatus of claim 12 wherein said means to move an ambient stream of air pressurizes said air stream within said air entry zone with ambient temperature air.

49. The heat exchange apparatus of claim 12 further comprising a passageway underneath said indirect section and above said sump, for receiving said second air stream exiting said indirect section.

* * * * *